US008788355B2

(12) United States Patent
Nakamura et al.

(10) Patent No.: US 8,788,355 B2
(45) Date of Patent: Jul. 22, 2014

(54) MEDIUM AND SYSTEM FOR SEARCHING COMMERCIAL MESSAGES

(75) Inventors: Osamu Nakamura, Saitama (JP); Motosugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1890 days.

(21) Appl. No.: 11/750,047

(22) Filed: May 17, 2007

(65) Prior Publication Data
US 2008/0107404 A1    May 8, 2008

(30) Foreign Application Priority Data

Jun. 1, 2006   (JP) ................................ 2006-153585

(51) Int. Cl.
*G06Q 30/00* (2012.01)
(52) U.S. Cl.
USPC .......................................... 705/26.1; 725/32
(58) Field of Classification Search
CPC ............................. H04N 21/812; H04H 60/48
USPC ........... 705/26, 27, 26.1, 27.1; 725/32, 36, 22
See application file for complete search history.

(56) References Cited

U.S. PATENT DOCUMENTS

| 6,100,941 | A * | 8/2000 | Dimitrova et al. ............. 348/700 |
| 6,263,505 | B1 * | 7/2001 | Walker et al. ................... 725/110 |
| 6,449,021 | B1 * | 9/2002 | Ohta et al. ...................... 348/700 |
| 6,549,922 | B1 * | 4/2003 | Srivastava et al. ..................... 1/1 |
| 6,968,364 | B1 * | 11/2005 | Wong et al. .................... 709/217 |
| 7,200,586 | B1 * | 4/2007 | Deguchi et al. ......................... 1/1 |
| 7,548,565 | B2 * | 6/2009 | Sull et al. ........................ 370/503 |
| 2002/0069408 | A1 | 6/2002 | Abe et al. |
| 2002/0095454 | A1 * | 7/2002 | Reed et al. ..................... 709/201 |
| 2003/0050926 | A1 * | 3/2003 | Agnihotri et al. ................. 707/5 |
| 2004/0218896 | A1 | 11/2004 | Abe et al. |
| 2005/0022236 | A1 * | 1/2005 | Ito et al. ........................... 725/39 |
| 2006/0117351 | A1 * | 6/2006 | Sanders et al. .................. 725/50 |
| 2006/0218576 | A1 * | 9/2006 | Johnson et al. ................. 725/32 |
| 2007/0036432 | A1 * | 2/2007 | Xu et al. ....................... 382/173 |

FOREIGN PATENT DOCUMENTS

| JP | 2002-010237 | 1/2002 | |
| JP | 3744464 | 2/2006 | |
| WO | WO 2005046237 A1 * | 5/2005 | ............. H04N 7/713 |

OTHER PUBLICATIONS

Dimitrova, N., et al. "Real time commercial detection using MPEG features." Proceedings of the 9th International Conference on Information Processing and Management of Uncertainty in Knowlwdge-based Systems (IPMU2002). 2002.*
Japanese Office Action dated Apr. 30, 2008 for Application No. 2006-153585.

\* cited by examiner

*Primary Examiner* — Matthew Zimmerman
(74) *Attorney, Agent, or Firm* — Dentons US LLP

(57) ABSTRACT

An information processing apparatus includes a detecting unit for detecting a commercial message contained in a broadcast television program, a feature quantity calculating unit for calculating a feature quantity of the detected commercial message, a recording unit for recording incidental information relating to the commercial message and the feature quantity of the commercial message, a searching unit for searching for a commercial message satisfying an identification condition, from among commercial messages detected, the identification condition identifying the commercial message and containing a period within which the commercial message has been broadcast and a communication unit for receiving a transmitted transmission request requesting transmission of the feature quantity and the incidental information of the broadcast commercial message satisfying the identification condition, and for transmitting the feature quantity and the incidental information of all commercial messages satisfying the identification condition obtained as a result of the search.

7 Claims, 31 Drawing Sheets

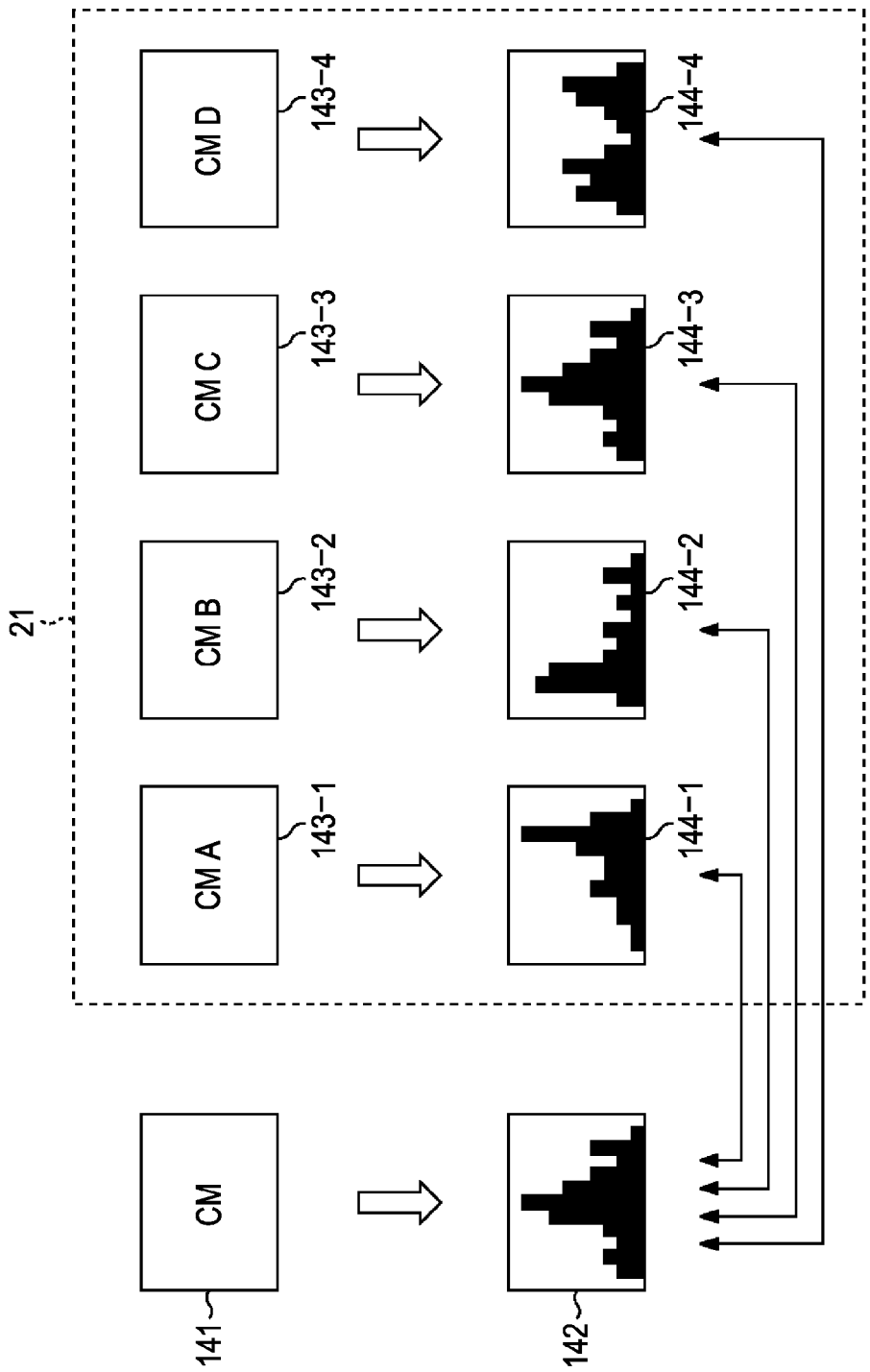

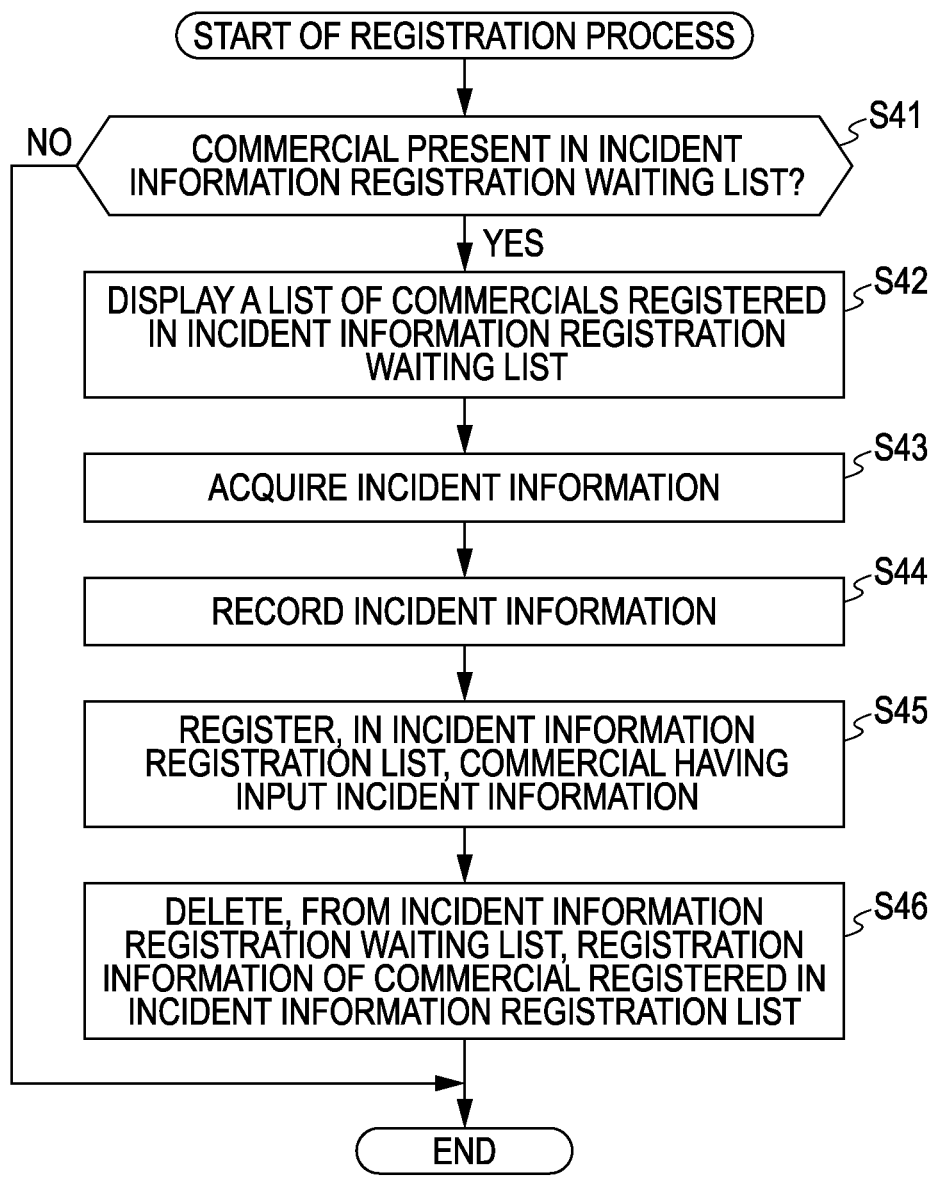

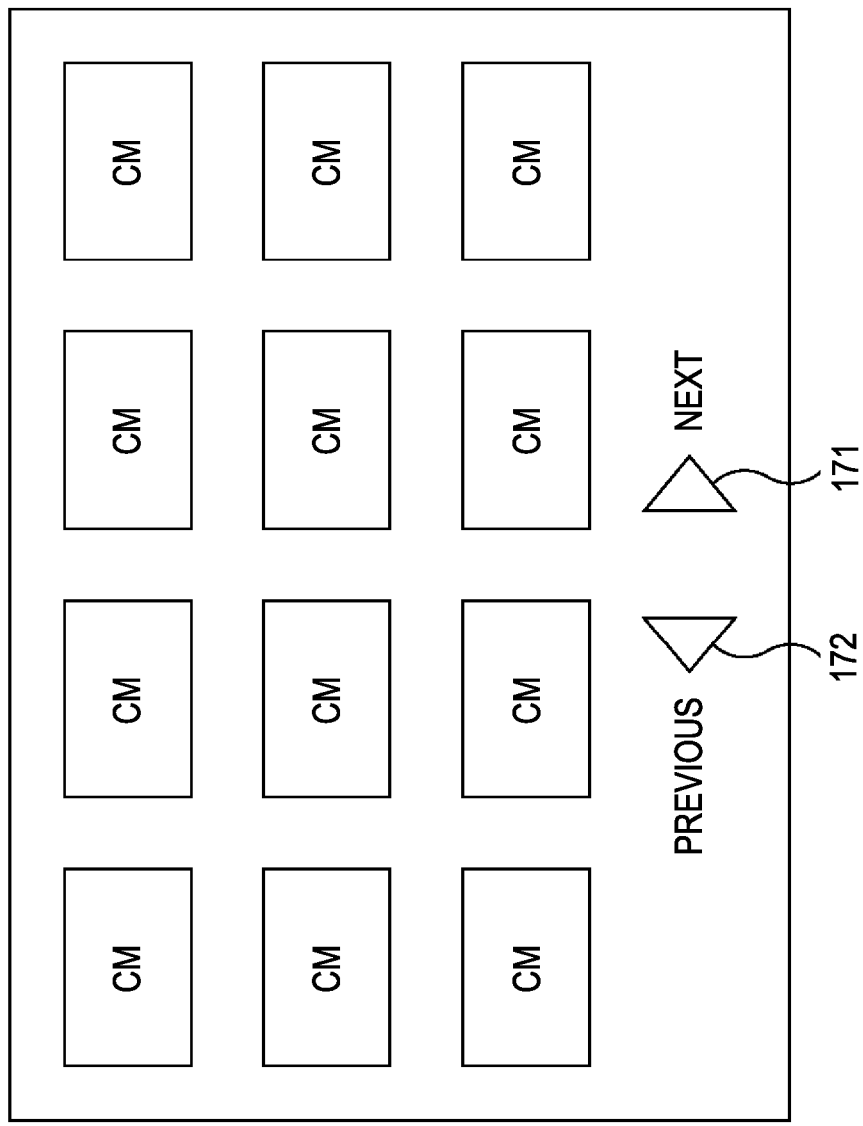

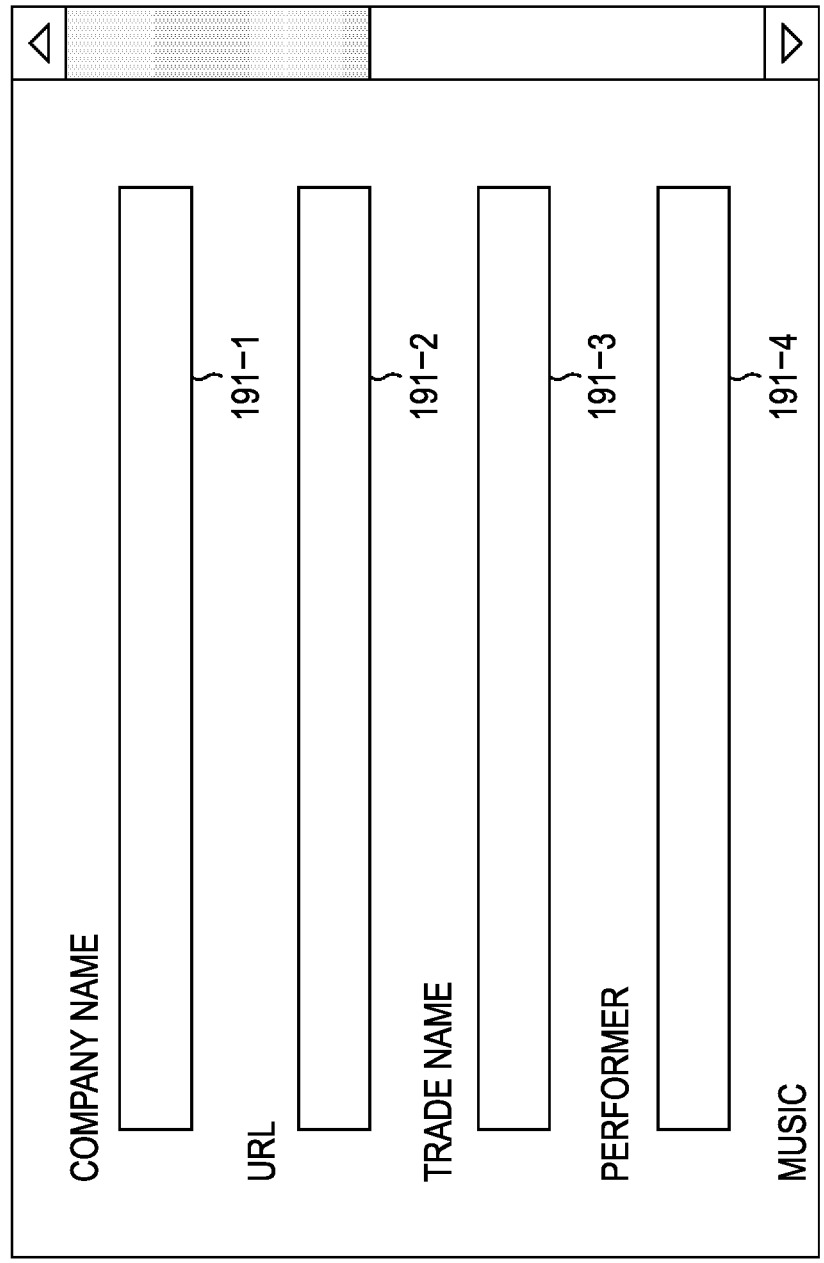

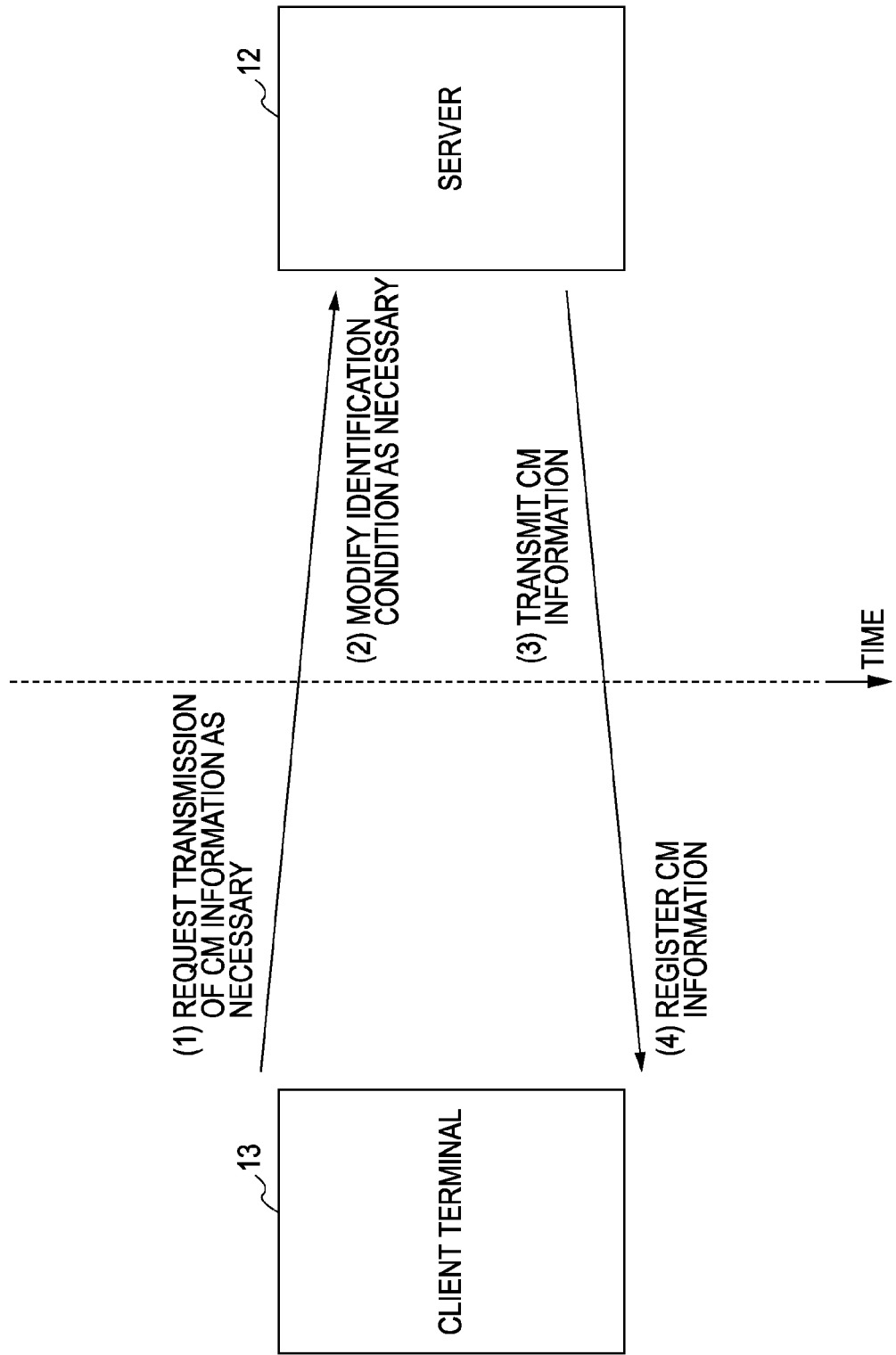

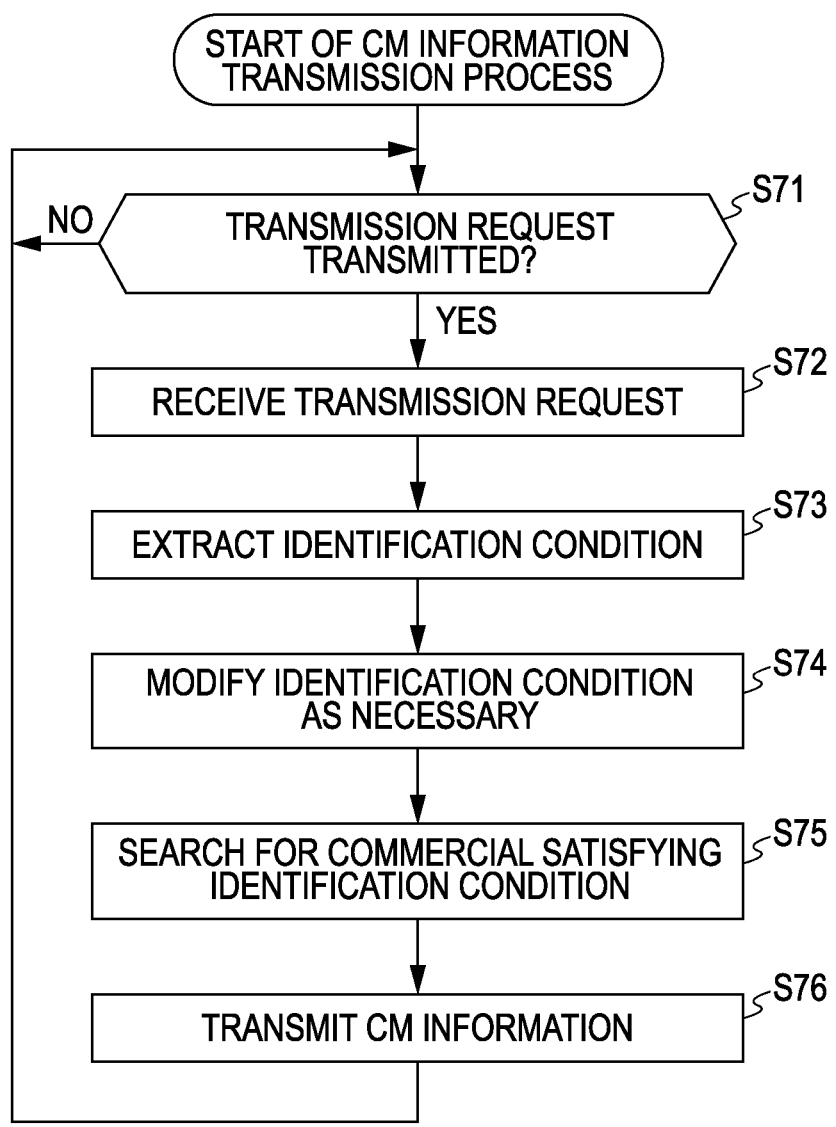

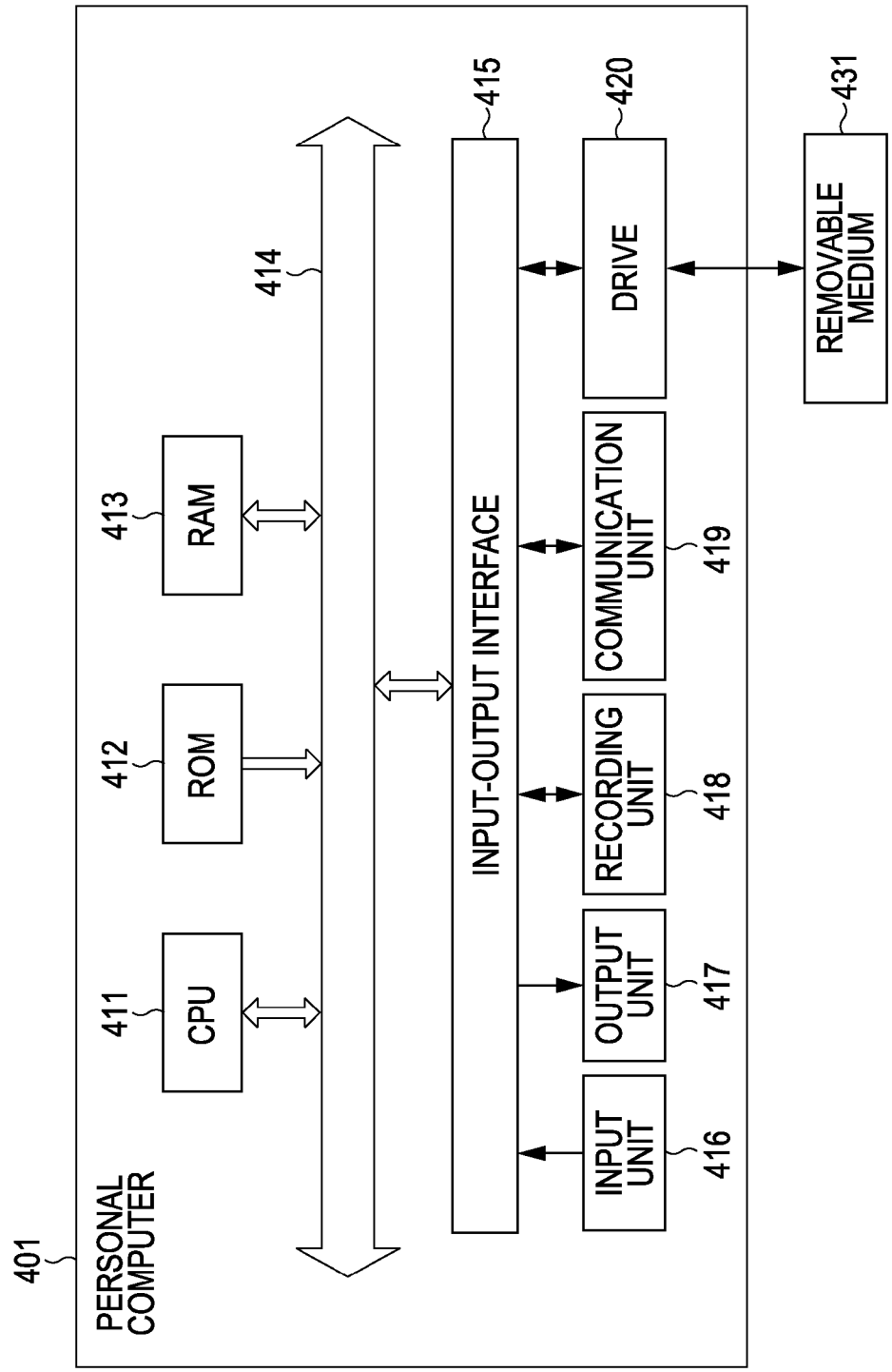

MEDIUM AND SYSTEM FOR SEARCHING COMMERCIAL MESSAGES

CROSS REFERENCES TO RELATED APPLICATIONS

The present invention contains subject matter related to Japanese Patent Application JP 2006-153585 filed in the Japanese Patent Office on Jun. 1, 2006, the entire contents of which are incorporated herein by reference.

BACKGROUND OF THE INVENTION

1. Field of the Invention

The present invention relates to a system, apparatus, method and computer program for processing information and, in particular, to a system, apparatus, method and computer program for acquiring more easily information relating to a commercial satisfying a desired condition.

2. Description of the Related Art

In TV broadcasting service, commercial messages (hereinafter simply referred to as commercials) are broadcast as an effective advertisement for consumers together with a TV broadcast program body. Since the commercial is typically subject to time limitation, it is generally difficult to furnish consumers with sufficient information regarding products and service.

To compensate for insufficient information regarding products and service, the products are displayed in shops for viewing or catalogs are supplied to potential customers. Since the Internet is widespread use, a supplier may arrange a website and posts product information on the website page.

Consumers may also wish to obtain information relating to broadcast commercials, trying to view a product advertised by a commercial, a performer appearing in a commercial, and music used in a commercial. Many consumers not only view an actual product in shops but also peruse catalogs and the Internet website information.

A consumer may watch a TV broadcast commercial and may be interested in information provided by the commercial. For more information, consumers are forced to write down a company name, a trade name, etc., from the broadcast commercial and visit shops or an Internet webpage. Although the Internet is in widespread use and a variety of information is quickly available, searching for information actually desired by the consumer still inconveniences the consumer. Within brief commercial time, the consumer sometimes misses a keyword required to search for desired information.

Japanese Unexamined Patent Application Publication No. 2002-10237 discloses a server that produces successively a history of broadcast commercials to help consumers in searching. When a client terminal operated by a user specifies time and channel on which a commercial has been broadcast, information regarding the commercial specified by the time and channel is transmitted to the client terminal connected via the Internet. With that commercial in hand, the user can easily acquire more information regarding the commercial.

SUMMARY OF THE INVENTION

The client needs to inquire the server via the Internet each time the user attempts to obtain information regarding the commercial. A substantial increase may arise in the number of enquiries to the server and the number of searches at the server.

When a new commercial is broadcast, many users attempt to acquire information regarding the new commercial. The server receives many enquiries. The number of accesses from the client to the server and the number of enquiries to the server become large.

It is difficult for the server to search for information in response to each enquiry and transmit information regarding the commercial to the client in a timely manner. As a result, each user is forced to wait for a long time before the user actually gets desired information relating to the desired commercial. Desired information cannot be easily obtained.

If a predetermined condition is set as a keyword, for example, with the above disclosed technique, the user cannot obtain the information regarding the commercial satisfying the condition.

For example, a user may wish to collect commercials performed by a performer. The user then video records a broadcast program using a hard disk recorder, and views the commercials contained in the broadcast program one by one.

Another user may wish to view a particular still unviewed commercial from among a series of commercials advertising a common product. In this case, the user watches all the television program to view the desired program the schedule of which is typically unknown to the user.

Each user can easily check broadcast time and channel of a broadcast program from a program guide, but the broadcast time and channel of the commercials are not publicly disclosed. The user cannot know when a desired commercial is broadcast.

It should be noted that the commercials are also copyright materials. Exchanging a video of a commercial via the Internet without permission from the copyright holder can violate the copyright law.

It is desirable to acquire easily information relating to commercials.

In accordance with one embodiment of the present invention, an information processing system includes a first information processing apparatus and a second information processing apparatus, connected to each other via a communication network. The first information processing apparatus includes a detecting unit for detecting a commercial message contained in a broadcast television program, a feature quantity calculating unit for calculating a feature quantity of the detected commercial message, a first recording unit for recording incidental information relating to the commercial message and the feature quantity of the commercial message, a searching unit for searching for a commercial message satisfying an identification condition, from among commercial messages detected, the identification condition identifying the commercial message and containing a period within which the commercial message has been broadcast, and a first communication unit for receiving a transmission request requesting transmission of the feature quantity and the incidental information of the commercial message satisfying the identification condition, the transmission request being transmitted from the second information processing apparatus, and for transmitting the feature quantity and the incidental information of all messages satisfying the identification condition obtained as a result of the search. The second information processing apparatus includes a second communication unit for transmitting the transmission request to the first information processing apparatus and for receiving the incidental information and the feature quantity transmitted from the first information processing apparatus, and a second recording unit for recording the received incidental information and the received feature quantity.

The first information processing apparatus of the information processing system thus detects the commercial message contained in the broadcast television program, calculates the feature quantity of the detected commercial message, records the incidental information relating to the commercial message and the feature quantity of the commercial message, searches for the commercial message satisfying the identification condition, from among the commercial messages detected, the identification condition identifying the commercial message and containing the period within which the commercial message has been broadcast, receives the transmission request requesting transmission of the feature quantity and the incidental information of the commercial message satisfying the identification condition, the transmission request being transmitted from the second information processing apparatus, and transmits the feature quantity and the incidental information of all messages satisfying the identification condition obtained as a result of the search. The second information processing apparatus of the information processing system transmits the transmission request to the first information processing apparatus, receives the incidental information and the feature quantity transmitted from the first information processing apparatus, and records the received incidental information and the received feature quantity.

In accordance with one embodiment of the present invention, an information processing apparatus includes a detecting unit for detecting a commercial message contained in a broadcast television program, a feature quantity calculating unit for calculating a feature quantity of the detected commercial message, a recording unit for recording incidental information relating to the commercial message and the feature quantity of the commercial message, a searching unit for searching for a commercial message satisfying an identification condition, from among commercial messages detected, the identification condition identifying the commercial message and containing a period within which the commercial message has been broadcast, and a communication unit for receiving a transmitted transmission request requesting transmission of the feature quantity and the incidental information of the broadcast commercial message satisfying the identification condition, and for transmitting the feature quantity and the incidental information of all commercial messages satisfying the identification condition obtained as a result of the search.

Preferably, the identification information identifies a broadcast station.

The information processing apparatus may further include an acquisition unit for acquiring the incidental information of the detected commercial message, the detected commercial message being input by an operator of the information processing apparatus.

The communication unit may receive the incidental information transmitted from another information processing apparatus connected thereto via a communication network.

In accordance with one embodiment of the present invention, one of an information processing method and a computer program includes steps of detecting a commercial message contained in a broadcast television program, calculating a feature quantity of the detected commercial message, controlling the recording of incidental information relating to the commercial message and the feature quantity of the commercial message, controlling the receiving of a transmitted transmission request requesting transmission of the feature quantity and the incidental information of the commercial message satisfying an identification condition, the identification condition identifying the commercial message and containing a period within which the commercial message has been broadcast, searching for a commercial message satisfying the received identification condition from among detected commercial messages, and controlling the transmitting of the feature quantity and the identification information of all commercial messages satisfying the identification condition obtained as a result of the search.

The commercial message contained in the broadcast television program is thus detected. The feature quantity of the detected commercial message is calculated. The recording of incidental information relating to the commercial message and the feature quantity of the commercial message is controlled. The receiving of the transmission request requesting transmission of the feature quantity and the incidental information of the commercial message satisfying the identification condition is controlled, the identification condition identifying the commercial message and containing the period within which the commercial message has been broadcast. The commercial message satisfying the received identification condition from among detected commercial messages is searched. The transmitting of the feature quantity and the identification information of all commercial messages satisfying the identification condition obtained as a result of the search is controlled.

In accordance with one embodiment of the present invention, an information processing apparatus includes a communication unit for transmitting a transmission request requesting transmission of incidental information relating to a commercial message satisfying an identification condition and a feature quantity of the commercial message, the identification condition identifying the commercial message and containing a period within which the commercial message has been broadcast, and for receiving the feature quantity and the incidental information of all commercial messages satisfying the identification information transmitted in response to the transmission request, and a recording unit for recording the received incidental information and the received feature quantity.

Preferably, the identification information identifies a broadcasting station.

The information processing apparatus may further include a detecting unit for detecting the commercial message contained in a broadcast television program, a feature quantity calculating unit for calculating the feature quantity of the detected commercial message, and a search unit for searching for the incidental information of the detected commercial message by comparing the feature quantity of the detected commercial message with the recorded feature quantity.

The information processing apparatus may further include a deleting unit for deleting incidental information, having failed to be hit in the search for a predetermined period of time since the reception thereof, out of the incidental information recorded on the recording unit, and the corresponding feature quantity of the commercial message having the incidental information to be deleted.

The information processing apparatus may further include a search unit for searching for a commercial message identified by an input keyword by referencing the recorded incidental information.

The information processing apparatus may further include a deleting unit for deleting incidental information and a feature quantity of the commercial message, each having failed to be hit in the search for a predetermined period of time since the reception thereof, out of the incidental information and the feature quantities recorded on the recording unit.

The information processing apparatus may further include a deleting unit for deleting incidental information and a feature quantity, each having aged for a predetermined period of time since the reception thereof, from among the incidental information and the feature quantities recorded on the recording unit.

The information processing apparatus may further include a receiving unit for receiving a broadcast television program, a detecting unit for detecting the commercial message contained in the received television program, a feature quantity calculating unit for calculating the feature quantity of the detected commercial message, and a video recording unit for recording the detected commercial message if the feature quantity of the detected commercial message matches the feature quantity of the commercial message program-recorded on the recording unit.

In accordance with one embodiment of the present invention, one of an information processing method and a computer program includes steps of controlling the transmitting of a transmission request requesting transmission of incidental information relating to a commercial message satisfying an identification condition and a feature quantity of the commercial message, the identification condition identifying the commercial message and containing a period within which the commercial message has been broadcast, controlling the receiving of the feature quantity and the incidental information of all commercial messages satisfying the identification information transmitted in response to the transmission request, and recording the received incidental information and the received feature quantity.

The transmission request requesting transmission of incidental information relating to the commercial message satisfying the identification condition and the feature quantity of the commercial message is thus transmitted, with the identification condition identifying the commercial message and containing the period within which the commercial message has been broadcast is received. The feature quantity and the incidental information of all commercial messages satisfying the identification information transmitted in response to the transmission request are received. The received incidental information and the received feature quantity are then recorded.

In accordance with one embodiment of the present invention, the information relating to a commercial is easily obtained.

In accordance with one embodiment of the present invention, the information relating to a desired commercial is easily obtained.

BRIEF DESCRIPTION OF THE DRAWINGS

FIG. 6 illustrates a search process using the feature quantity;

FIG. 8 is a flowchart illustrating a registration process;

FIG. 9 illustrates a display example of a list of commercials;

FIG. 10 illustrates a display example on an incidental information input screen;

FIG. 11 illustrates a transmission and reception process of commercial information;

FIG. 12 is a flowchart illustrating a commercial information transmission process;

FIG. 31 is a block diagram illustrating a personal computer.

DESCRIPTION OF THE PREFERRED EMBODIMENTS

Figure 1:
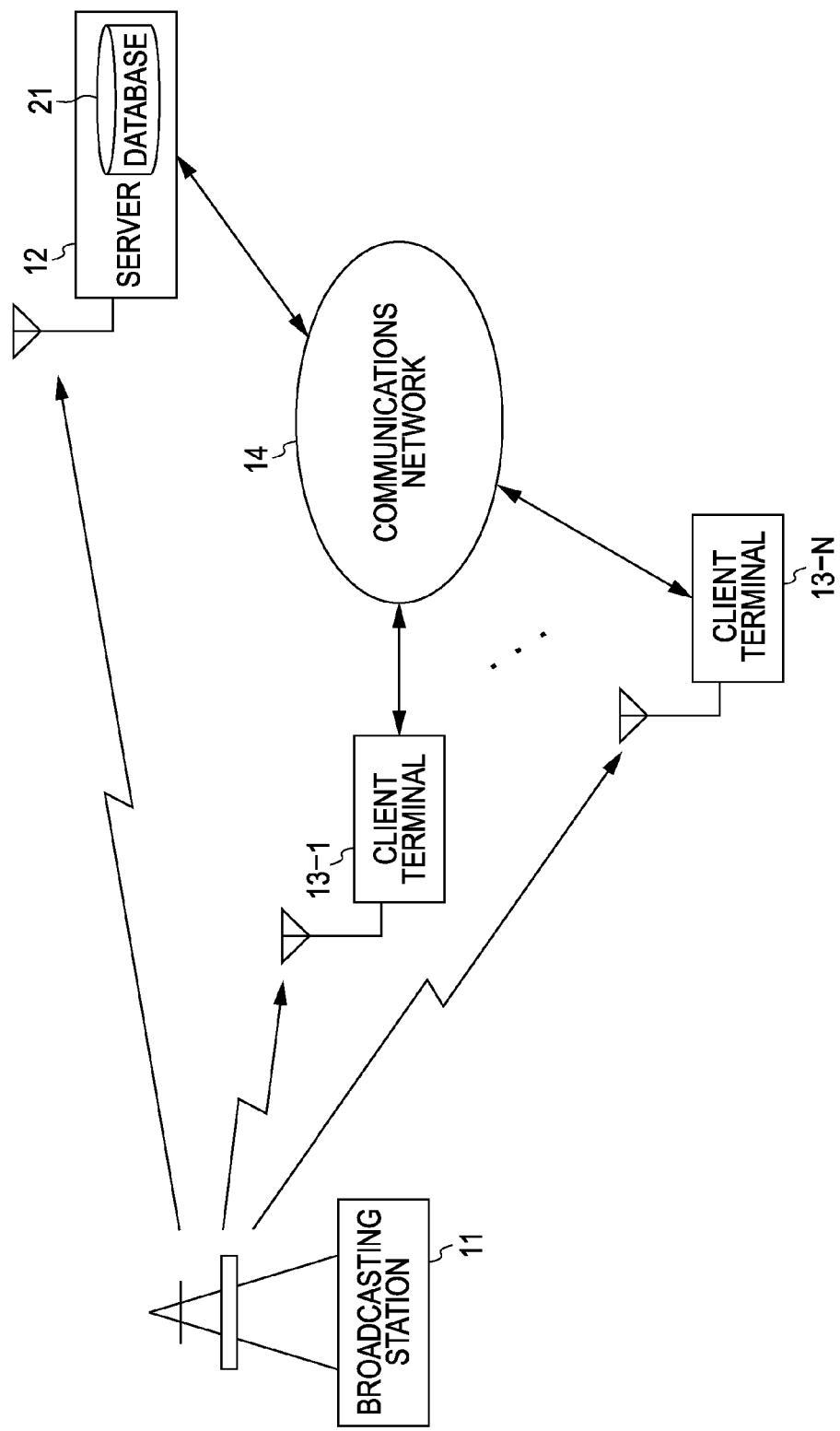
FIG. 1 illustrates a configuration of a commercial information providing system in accordance with one embodiment of the present invention.

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

In accordance with one embodiment of the present invention, an information processing system includes a first information processing apparatus (for example, server 12 of FIG. 2) and a second information processing apparatus (for example, client terminal 13 of FIG. 3), connected to each other via a communication network. The first information processing apparatus includes a detecting unit (for example, detector 61 of FIG. 2) for detecting a commercial message contained in a broadcast television program, a feature quantity calculating unit (for example, feature quantity calculator 62 of FIG. 2) for calculating a feature quantity of the detected commercial message, a first recording unit (for example, database 21 of FIG. 2) for recording incidental information relating to the commercial message and the feature quantity of the commercial message, a searching unit (for example, searcher 64 of FIG. 2) for searching for a commercial message satisfying an identification condition, from among commercial messages detected, the identification condition identifying the commercial message and containing a period within which the commercial message has been broadcast, and a first communication unit (for example, communication unit 58 of FIG. 2) for receiving a transmission request requesting transmission of the feature quantity and the incidental information of the commercial message satisfying the identification condition, the transmission request being transmitted from the second information processing apparatus, and for transmitting the feature quantity and the incidental information of all messages satisfying the identification condition obtained as a result of the search. The second information processing apparatus includes a second communication unit (for example, communication unit 100 of FIG. 3) for transmitting the transmission request to the first information processing apparatus and for receiving the incidental information and the feature quantity transmitted from the first information processing apparatus, and a second recording unit (for example, database 95 of FIG. 3) for recording the received incidental information and the received feature quantity.

In accordance with one embodiment of the present invention, an information processing apparatus includes a detecting unit (for example, detector 61 of FIG. 2) for detecting a commercial message contained in a broadcast television program, a feature quantity calculating unit (for example, feature quantity calculator 62 of FIG. 2) for calculating a feature quantity of the detected commercial message, a recording unit (for example, database 21 of FIG. 2) for recording incidental information relating to the commercial message and the feature quantity of the commercial message, a searching unit (for example, searcher 64 of FIG. 2) for searching for a commercial message satisfying an identification condition, from among commercial messages detected, the identification condition identifying the commercial message and containing a period within which the commercial message has been broadcast, and a communication unit (for example, communication unit 58 of FIG. 2) for receiving a transmitted transmission request requesting transmission of the feature quantity and the incidental information of the broadcast commercial message satisfying the identification condition, and for transmitting the feature quantity and the incidental information of all commercial messages satisfying the identification condition obtained as a result of the search.

The information processing apparatus may further include an acquisition unit (for example, input controller 55 of FIG. 2) for acquiring the incidental information of the detected commercial message, the detected commercial message being input by an operator of the information processing apparatus.

Figure 28:
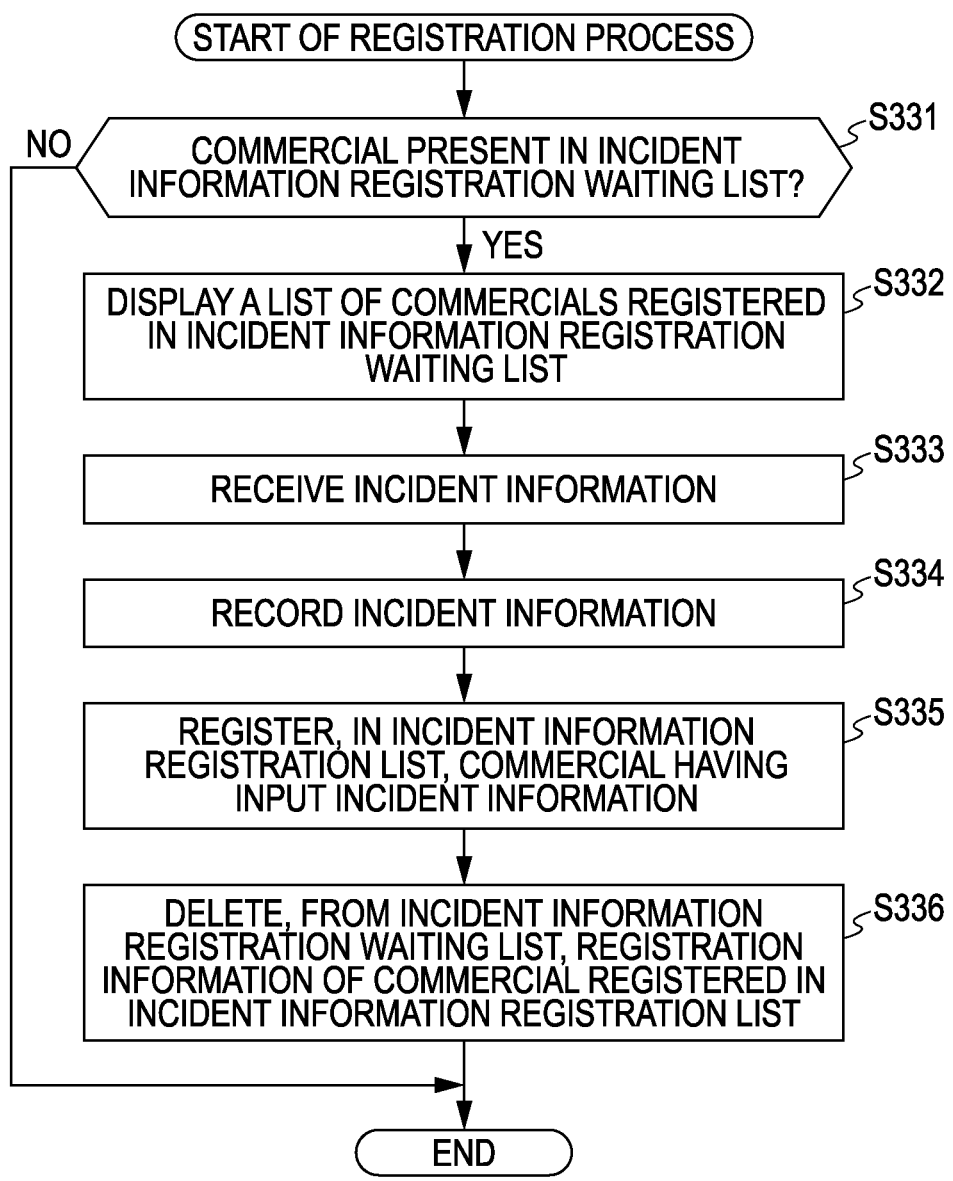
FIG. 28 is a flowchart illustrating a registration process.

The communication unit may receive the incidental information transmitted from another information processing apparatus connected thereto via a communication network (for example, in step S333 of FIG. 28).

In accordance with one embodiment of the present invention, one of an information processing method and a computer program includes steps of detecting a commercial message contained in a broadcast television program (for example, in step S12 of FIG. 4), calculating a feature quantity of the detected commercial message (for example, in step S14 of FIG. 4), controlling the recording of incidental information relating to the commercial message and the feature quantity of the commercial message (for example, in step S19 of FIG. 4 and step S44 of FIG. 8), controlling the receiving of a transmitted transmission request requesting transmission of the feature quantity and the incidental information of the commercial message satisfying an identification condition, the identification condition identifying the commercial message and containing a period within which the commercial message has been broadcast (for example, in step S72 of FIG. 12), searching for a commercial message satisfying the received identification condition from among detected commercial messages (for example, in step S75 of FIG. 12), and controlling the transmitting of the feature quantity and the identification information of all commercial messages satisfying the identification condition obtained as a result of the search (for example, in step S76 of FIG. 12).

In accordance with one embodiment of the present invention, an information processing apparatus includes a communication unit (for example, communication unit 100 of FIG. 3) for transmitting a transmission request requesting transmission of incidental information relating to a commercial message satisfying an identification condition and a feature quantity of the commercial message, the identification condition identifying the commercial message and containing a period within which the commercial message has been broadcast, and for receiving the feature quantity and the incidental information of all commercial messages satisfying the identification information transmitted in response to the transmission request, and a recording unit (for example, database 95 of FIG. 3) for recording the received incidental information and the received feature quantity.

The information processing apparatus may further include a detecting unit (for example, detector 112 of FIG. 3) for detecting the commercial message contained in a broadcast television program, a feature quantity calculating unit (for example, feature quantity calculator 113 of FIG. 3) for calculating the feature quantity of the detected commercial message, and a search unit (for example, searcher 115 of FIG. 3) for searching for the incidental information of the detected commercial message by comparing the feature quantity of the detected commercial message with the recorded feature quantity.

The information processing apparatus may further include a deleting unit (for example, register 114 of FIG. 3) for deleting incidental information, having failed to be hit in the search for a predetermined period of time since the reception thereof, out of the incidental information recorded on the recording unit, and the corresponding feature quantity of the commercial message having the incidental information to be deleted.

The information processing apparatus may further include a search unit (for example, searcher 115 of FIG. 3) for searching for a commercial message identified by an input keyword by referencing the recorded incidental information.

The information processing apparatus may further include a deleting unit (for example, register 114 of FIG. 3) for deleting incidental information and a feature quantity of the commercial message, each having failed to be hit in the search for a predetermined period of time since the reception thereof, out of the incidental information and the feature quantities recorded on the recording unit.

The information processing apparatus may further include a deleting unit (for example, register 114 of FIG. 3) for deleting incidental information and a feature quantity, each having aged for a predetermined period of time since the reception thereof, from among the incidental information and the feature quantities recorded on the recording unit.

The information processing apparatus may further include a receiving unit (for example, broadcast receiver 91 of FIG. 3) for receiving a broadcast television program, a detecting unit (for example, detector 112 of FIG. 3) for detecting the commercial message contained in the received television program, a feature quantity calculating unit (for example, feature quantity calculator 113 of FIG. 3) for calculating the feature quantity of the detected commercial message, and a video recording unit (for example, register 114 of FIG. 3) for recording the detected commercial message if the feature quantity of the detected commercial message matches the feature quantity of the commercial message to be program-recorded on the recording unit.

Figure 13:
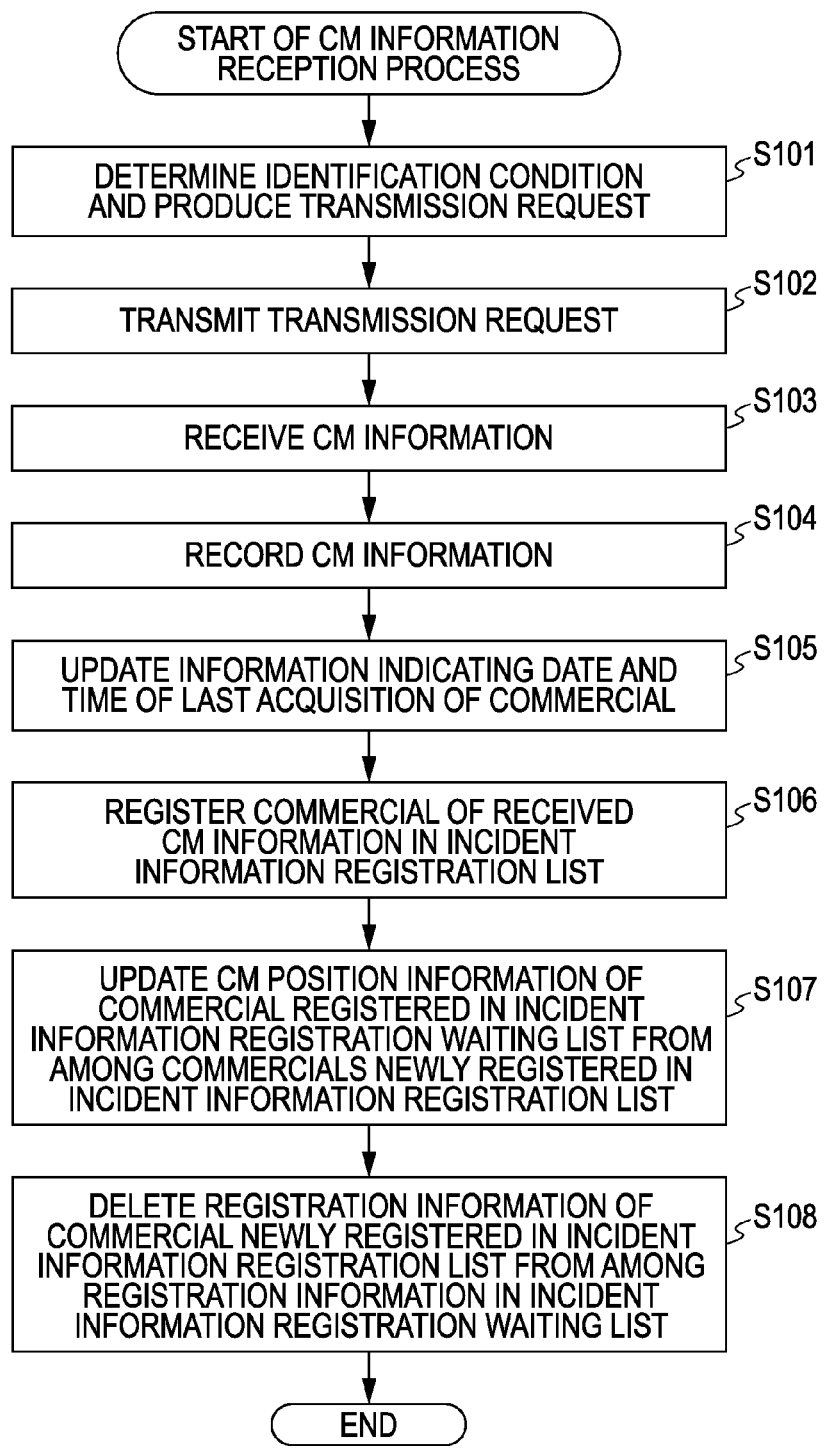
FIG. 13 is a flowchart illustrating a commercial information reception process.

In accordance with one embodiment of the present invention, one of an information processing method and a computer program includes steps of controlling the transmitting of a transmission request requesting transmission of incidental information relating to a commercial message satisfying an identification condition and a feature quantity of the commercial message, the identification condition identifying the commercial message and containing a period within which the commercial message has been broadcast (for example, in step S102 of FIG. 13), controlling the receiving of the feature quantity and the incidental information of all commercial messages satisfying the identification information transmitted in response to the transmission request (for example, in step S103 of FIG. 13), and recording the received incidental information and the received feature quantity (for example, in step S104 of FIG. 13).

The embodiments of the present invention are described below with reference to the drawings.

FIG. 1 illustrates a commercial (CM) information providing system in accordance with one embodiment of the present invention. The CM information providing system includes a broadcasting station 11, a server 12, client terminals 13-1 through 13-N (13-2 through 13-(N-1) are not shown).

In the CM information providing system, the server 12 and the client terminals 13-1 through 13-N are interconnected to each other via a communications network 14 such as the Internet.

The broadcasting station 11 television-broadcasts a television program composed of a program body and a commercial message (hereinafter simply referred to as a commercial).

The server 12 receives the program broadcast by the broadcasting station 11 and records the commercial contained in the program and commercial (CM) information incidental to the commercial with the commercial in association with the CM information. The CM information is information incidental to the commercial, including a feature quantity representing a feature of the commercial, a trade name of a product and a company name advertised by the commercial, an address of a website presenting information regarding the product described in uniform resource locator (URL), a name of a performer appearing in the commercial, music, a period of time within which the commercial has been broadcast, etc.

The server 12 includes a database 21. The server 12 records a commercial contained in a received broadcast program and the CM information of the commercial onto the database 21.

In response to a request received from one of the client terminals 13-1 through 13-N via a communications network 14, the server 12 searches for the CM information associated with a commercial satisfying a predetermined condition, and transmits at a time all CM information obtained as a result of the search via the communications network 14 to the one of the client terminals 13-1 through 13-N having requested the transmission of the CM information.

Each of the client terminals 13-1 through 13-N, including one of a personal computer and a hard disk recorder, is operated by a user as a viewer of the program broadcast by the broadcasting station 11.

Each of the client terminals 13-1 through 13-N receives the program broadcast by the broadcasting station 11, and displays the received program, or records the received program.

In response to a user operation, each of the client terminals 13-1 through 13-N requests the server 12 to transmit the CM information associated with the commercial satisfying the predetermined condition, and then receives the CM information transmitted by the server 12 in response to the request.

Each of the client terminals 13-1 through 13-N displays incidental information contained in the received CM information, thereby presenting information relating to the commercial. If it is not necessary to discriminate between the client terminals 13-1 through 13-N, each of the client terminals 13-1 through 13-N is simply referred to as a client terminal 13.

Although a single broadcasting station 11 is shown in FIG. 1, a plurality of broadcasting stations 11 may be employed.

Figure 2:
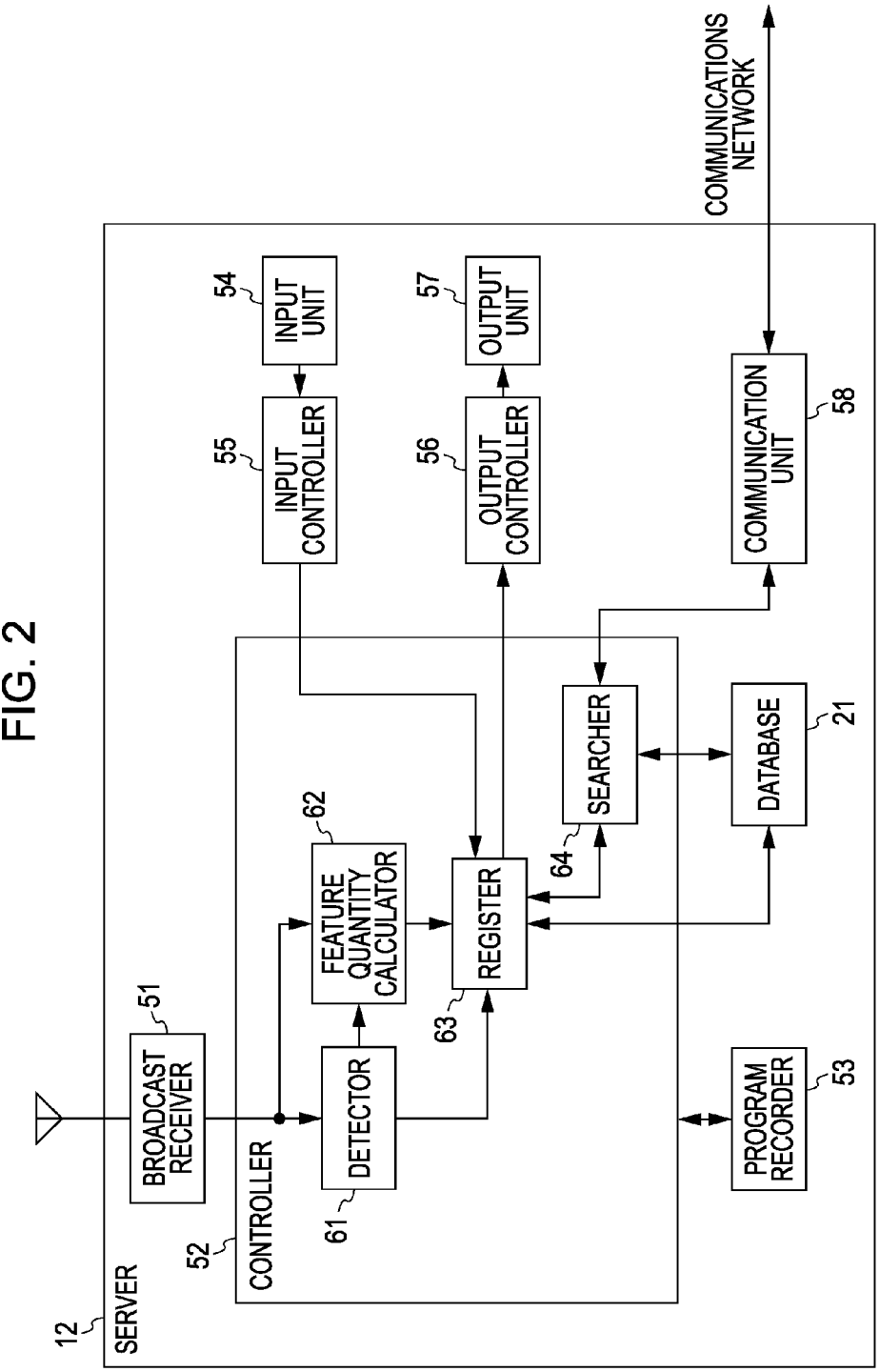
FIG. 2 is a block diagram illustrating a structure of a server.

FIG. 2 is a block diagram illustrating a structure of the server 12 of FIG. 1.

The server 12 includes the database 21, a broadcast receiver 51, a controller 52, a program recorder 53, an input unit 54, an input controller 55, an output controller 56, an output unit 57, and a communication unit 58.

The broadcast receiver 51 receives a broadcast television program, and extracts from the received television program a video signal of the program, channel information, broadcast mode information, information incidental to the video signal such as data broadcast together with the program. The broadcast receiver 51 then supplies the controller 52 with the extracted information. For example, the broadcast mode information indicates what type the received broadcast program is, for example, a stereophonic program, a monophonic program, or a bilingual program.

The controller 52 reads a variety of computer programs recorded on the program recorder 53, and thus generally controls the server 12. The controller 52 includes a detector 61, a feature quantity calculator 62, a register 63, and a searcher 64.

The detector 61 detects a commercial from a video signal of the broadcast program supplied from the broadcast receiver 51, and then supplies the detected commercial to the register 63. The feature quantity calculator 62 calculates a feature quantity indicating a feature of the detected commercial, based on the video signal of the broadcast program supplied from the broadcast receiver 51, and then supplies the calculated feature quantity to the register 63.

The register 63 supplies to the database 21 the commercial supplied from the detector 61 and the feature quantity supplied from the feature quantity calculator 62, thereby registering the commercial in an incidental information registration waiting list.

The database 21 includes the incidental information registration waiting list listing newly detected commercials, incidental information of which remains to be input by an operator of the server 12. The incidental information registration waiting list thus lists the newly detected commercials and the feature quantities of the newly detected commercials.

The register 63 supplies a list of commercials listed in the incidental information registration waiting list of the database 21 to the output controller 56.

The register 63 receives from the input controller 55 the incidental information of the commercial registered in the incidental information registration waiting list. The register 63 updates an incidental information registration list recorded in the database 21 so that the incidental information registration list contains the commercial and the feature quantity listed in the incidental information registration waiting list and the incidental information supplied from the input controller 55. The register 63 thus registers the commercial in the incidental information registration list. The incidental information registration list lists the registered commercial, the feature quantity thereof, and the incidental information thereof. The incidental information registration list will be described in detail later.

The searcher 64 searches for a commercial satisfying a predetermined condition from among commercials registered in the incidental information registration list of the database 21, and supplies, as the CM information, the incidental information and the feature quantity of the commercial hit in the search to the communication unit 58.

The database 21, including a hard disk, records a variety of data and information, such as the incidental information registration waiting list and the incidental information registration list. The input unit 54, including a mouse and a keyboard, supplies a signal responsive to an operation of the operator of the server 12 to the input controller 55. The input controller 55 acquires the signal responsive to the operation of the operator from the input unit 54, and then supplies the signal to the register 63.

The output controller 56 outputs a list of commercials supplied from the register 63 to the output unit 57 to display the list. The output unit 57, including a liquid-crystal display and a loudspeaker, reproduces a video and audio in response to a video signal and the like supplied from the output controller 56. The communication unit 58 communicates with the client terminal 13 via the communications network 14 to exchange a variety of data and information.

The server 12 of FIG. 2 includes the input unit 54 and the output unit 57. Alternatively, the input unit 54 and the output unit 57 may be externally arranged to the server 12.

Figure 3:
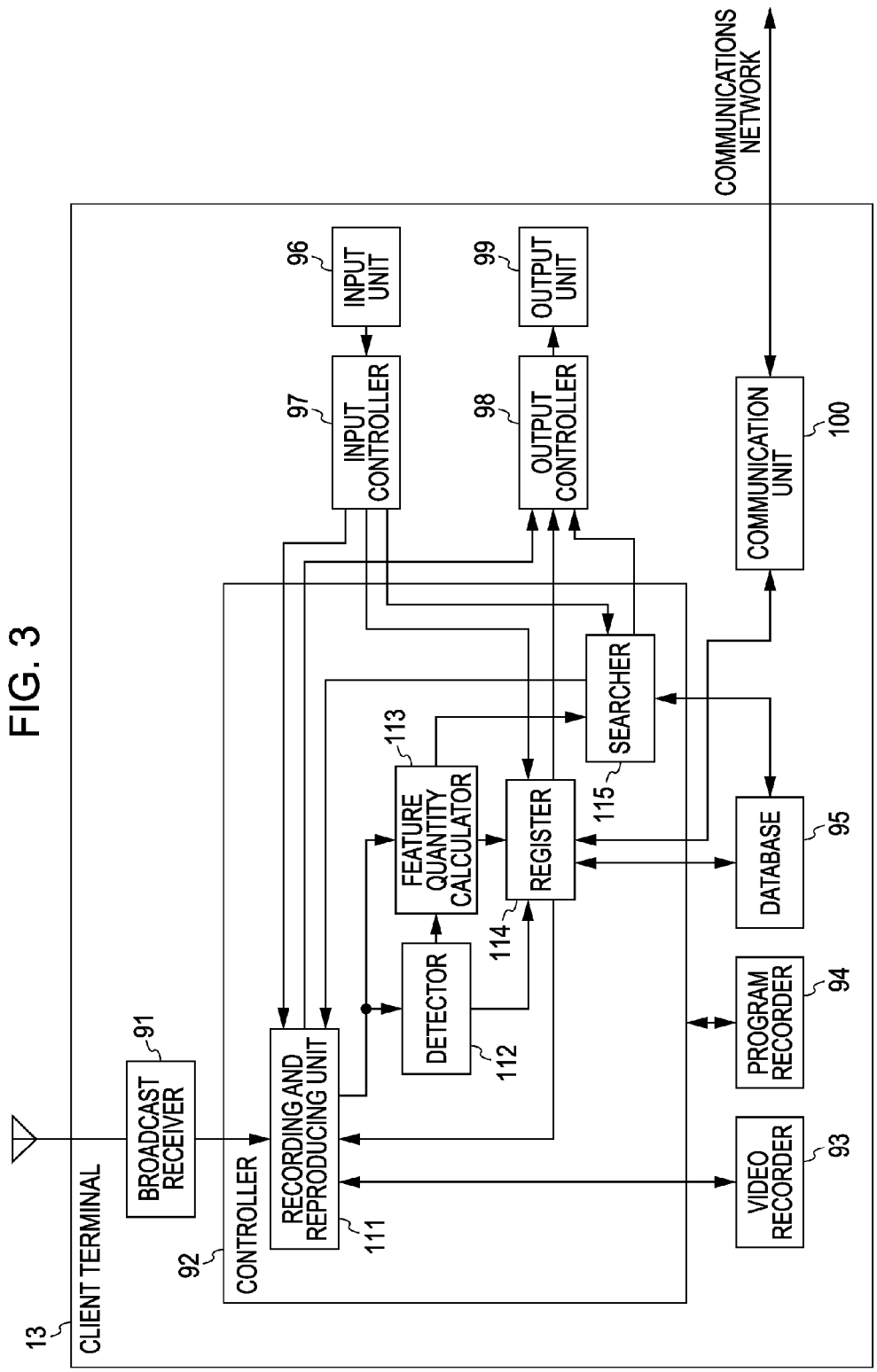
FIG. 3 is a block diagram illustrating a structure of a client.

FIG. 3 is a block diagram illustrating a structure of the client terminal 13 of FIG. 1.

The client terminal 13 includes a broadcast receiver 91, a controller 92, a video recorder 93, a program recorder 94, a database 95, an input unit 96, an input controller 97, an output controller 98, an output unit 99 and a communication unit 100.

The broadcast receiver 91 receives a broadcast program, extracts, from the received program, a video signal of the program, channel information, broadcast mode information, data broadcast together with the program and incidental to the video signal, and then supplies the extracted information to the controller 92.

The controller 92 reads and executes a variety of computer programs recorded on the program recorder 94, thereby generally controlling the client terminal 13. The controller 92 includes a recording and reproducing unit 111, a detector 112, a feature quantity calculator 113, a register 114 and a searcher 115.

The recording and reproducing unit 111 supplies a video signal of a broadcast program supplied from the broadcast receiver 91 to one of the video recorder 93, the output controller 98, the detector 112 and the feature quantity calculator 113. The recording and reproducing unit 111 also supplies the video signal of the television program acquired from the video recorder 93 to one of the output controller 98, the detector 112 and the feature quantity calculator 113.

The detector 112 detects a commercial from the video signal of the television program supplied from the recording and reproducing unit 111. The feature quantity calculator 113 calculates a feature quantity representing a feature of the detected commercial, based on the video signal of the television program supplied from the recording and reproducing unit 111, and then supplies the calculated feature quantity to the register 114.

The register 114 registers the commercial in the incidental information registration waiting list by supplying the feature quantity from the feature quantity calculator 113 to the database 95 for recording.

The database 95 includes the incidental information registration waiting list listing newly detected commercials, incidental information of which remains to be acquired from the server 12. The incidental information registration waiting list lists the feature quantities of the newly detected commercials.

When the client terminal 13 receives the CM information from the server 12, the register 114 updates the incidental information registration list recorded on the database 95 so that the incidental information registration list contains the feature quantity and the incidental information, each contained in the received CM information. The register 114 thus registers the commercial in the incidental information registration list. The incidental information registration list lists the feature quantity and the incidental information of the registered commercial. The incidental information registration list will be described in detail later.

The searcher 115 searches for a commercial satisfying a predetermined condition from among commercials registered in the incidental information registration list of the database 95, and supplies the incidental information of the commercial hit in the search to the output control unit 98.

The video recorder 93, including a hard disk, records the video signal of a program supplied from the recording and reproducing unit 111. The database 95, including a hard disk, records a variety of data and information including CM position information indicating a position of a commercial contained in a program recorded on the video recorder 93, the incidental information registration waiting list, and the incidental information registration list.

The input unit 96, including a mouse, a keyboard, a remote commander, etc., supplies a signal responsive to a user operation to the input controller 97. Upon receiving the signal responsive to the user operation from the input unit 96, the input controller 97 supplies the signal to each of the recording and reproducing unit 111, the register 114 and the searcher 115.

The output controller 98 supplies to the output unit 99 a variety of information including the video information supplied from each of the recording and reproducing unit 111, the register 114 and the searcher 115. The output unit 99, including a liquid-crystal display, a loudspeaker, etc., reproduces an image and an audio in response to the video signal and the like supplied from the output controller 98. The communication unit 100 communicates with the server 12 via the communications network 14, thereby exchanging a variety of data and information.

The client terminal 13 of FIG. 3 includes the input unit 96 and the output unit 99. Alternatively, the input unit 96 and the output unit 99 may be arranged to be external to the client terminal 13.

The server 12 receives a program broadcast by the broadcasting station 11, and detects a commercial from the received program. When a new commercial is detected, the server 12 registers the commercial in the incidental information registration waiting list.

A provisional registration process is described below with reference to a flowchart of FIG. 4. In the provisional registration process, the server 12 detects a new commercial and then registers the new commercial in the incidental information registration waiting list.

In step S11, the broadcast receiver 51 receives the program broadcast from the broadcasting station 11, and supplies the received program to each of the detector 61 and the feature quantity calculator 62. If a program transmitted from the broadcasting station 11 is an analog signal, the broadcast receiver 51 receives and converts an analog video signal of the program into a digital video signal, and supplies the digital video signal to each of the detector 61 and the feature quantity calculator 62.

In step S12, the detector 61 detects a commercial from the program supplied from the broadcast receiver 51. For example, the detector 61 detects the commercial using a technique disclosed Japanese Unexamined Patent Application Publication No. 2002-16873.

More specifically, based on required conditions, the detector 61 detects from the program a period within which a commercial candidate is present. The required conditions include most of features of a commercial, such as a broadcast time length of the commercial, a volume level of the commercial, switching of videos, etc. Based on incidental condition serving as an indicator indicating the likelihood of commercial, the detector 61 selects the period of the commercial from detected candidates. The method of detecting the commercial is not limited to the one described above. Any method will be acceptable as long as a commercial is reliably detected.

In step S13, the detector 61 determines whether any commercial has been detected. If it is determined in step S13 that no commercial has been detected, processing returns to step S11 to repeat step S11 and subsequent steps.

If it is determined in step S13 that a commercial has been detected, the detector 61 extracts the detected commercial from the program and supplies the commercial to the register 63. The detector 61 also instructs the feature quantity calculator 62 to calculate a feature quantity. Processing proceeds to step S14.

In step S14, the feature quantity calculator 62 calculates the feature quantity indicating the feature of the detected commercial, contained in the program supplied from the broadcast receiver 51, in response to the instruction from the detector 61 and then supplies the calculated feature quantity to the register 63.

For example, the feature quantity calculator 62 calculates the feature quantity using a technique disclosed Japanese Patent No. 3744464. More specifically, the feature quantity calculator 62 calculates the mean value of pixel values of corresponding pixels across frames forming the commercial during a predetermined period, and then determines a mean image composed of pixels, each having a respective average pixel value. The feature quantity calculator 62 partitions the mean image into several blocks, calculates the mean value of the pixel values of the pixels within each block, arranges the mean values of the blocks into a vector, and performs a layered conversion process to the vector. The resulting value is the feature quantity.

The method of calculating the feature quantity of the commercial is not limited to the above-described method. Any method is acceptable as long as the method results in the feature quantity that is substantially smaller in amount than the original video of the commercial and discriminate the original video.

For example, the feature quantity calculator 62 may produce, on each frame forming the commercial, a histogram having the number of pixels and luminance value plotted along axes thereof. The feature quantity calculator 62 may then determine data representing the number of pixels per luminance value basis, and produce a vector by arranging the data on a per frame basis. The vector is handled as the feature quantity.

Figure 5A:
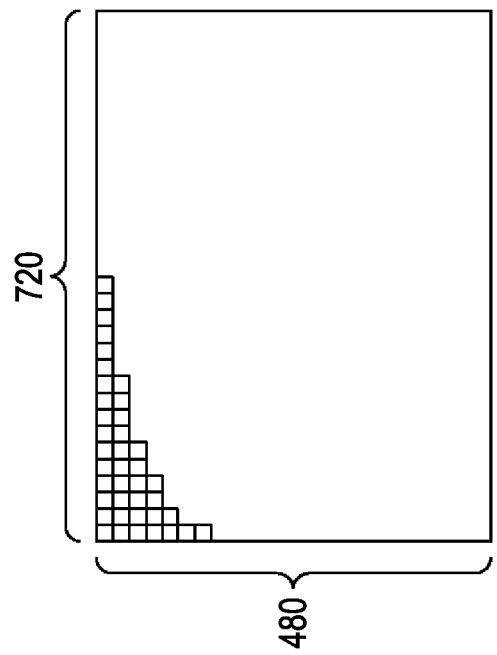
FIGS. 5A and 5B illustrate an example of a feature quantity.

If the video signal is a National Television Standards Committee (NTSC) signal, the video of one second is composed of 30 images. In a standard definition (SD) image as shown in FIG. 5A, 720 pixels are horizontally arranged in a horizontal direction and 480 pixels are arranged in a vertical direction. A single pixel has three values of R (red), G (green) and B (blue).

If each of R, G and B of each pixel of the SD image is represented by one byte, an amount of data of one image becomes about 1 megabytes (720×480×3=1036800). For example, the reproducing time of a commercial may be 15 seconds. Since the commercial is composed of about 450 images, the amount of data becomes about 450 (1×450) megabytes. When the commercial is compressed at a low rate of 2 Mbps in accordance with the moving picture experts group (MPEG) phase 2, the amount of data of the commercial of 15 seconds becomes about 4 megabytes ($\approx 2 \times 15/8$).

Figure 5B:
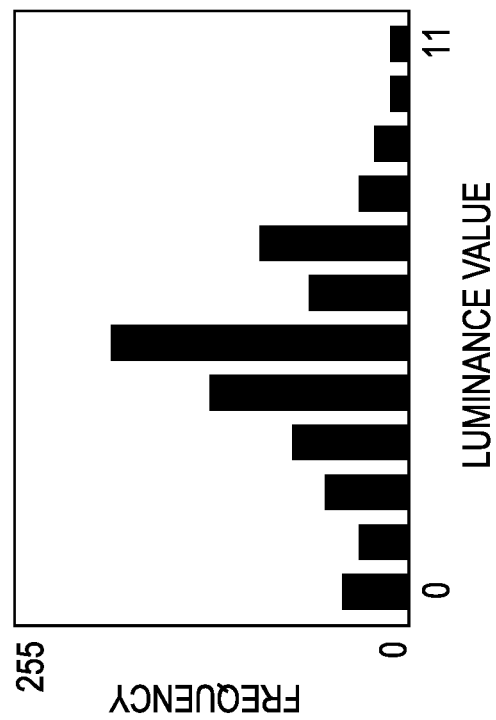

As shown in FIG. 5B, a histogram is produced on a per frame basis, each frame forming the commercial. One frame, namely, one image is represented by 12 bytes. In FIG. 5B, the abscissa represents luminance value while the ordinate represents the number of pixels having each luminance value, namely, frequency of occurrence.

As shown in FIG. 5B, the luminance value of each pixel takes one of 0 through 255, and the entire range of the pixel value of 0 through 255 is then equally divided into 16 luminance bands. Each luminance band is normalized to be represented by 1 byte. The frequency of occurrence of the pixels in the vicinity of zero pixel value, namely, black pixel, and the pixels in the vicinity of 255 pixel value, namely white pixel, is not so high, and 4 bands in the vanity of the zero pixel value and the 255 pixel value are thus removed.

FIG. 5B illustrates the frequency of occurrence of pixels, namely, the number of pixels forming one image on per luminance value range, namely, the number of pixels falling within a luminance value range from 32 to 47, the number of pixels falling within a luminance value range from 48 to 63, the number of pixels falling within a luminance value range from 64 through 79, the number of pixels falling within a luminance value range from 80 to 95, the number of pixels falling within a luminance value range from 96 to 111, the number of pixels falling within a luminance value range from 112 to 127, the number of pixels falling within a luminance value range from 128 to 143, the number of pixels falling within a luminance value range from 144 to 159, pixels falling within a luminance value range from 160 to 175, the number of pixels falling within a luminance value range from 176 to 191, the number of pixels falling within a luminance value range from 192 to 207, and the number of pixels falling within a luminance value range from 208 to 223.

The histogram of each image forming the commercial is thus determined, and the feature quantity is produced from the histogram. The amount of data of the feature quantity of the commercial having a reproducing period of 15 seconds becomes about 5 kilobytes ($\approx 12 \times 30 \times 15$). Although the original commercial cannot be imagined from the feature quantity thus obtained, the same feature quantity is calculated from the same commercial while a different feature quantity is calculated from a different commercial with a high probability.

Figure 4:
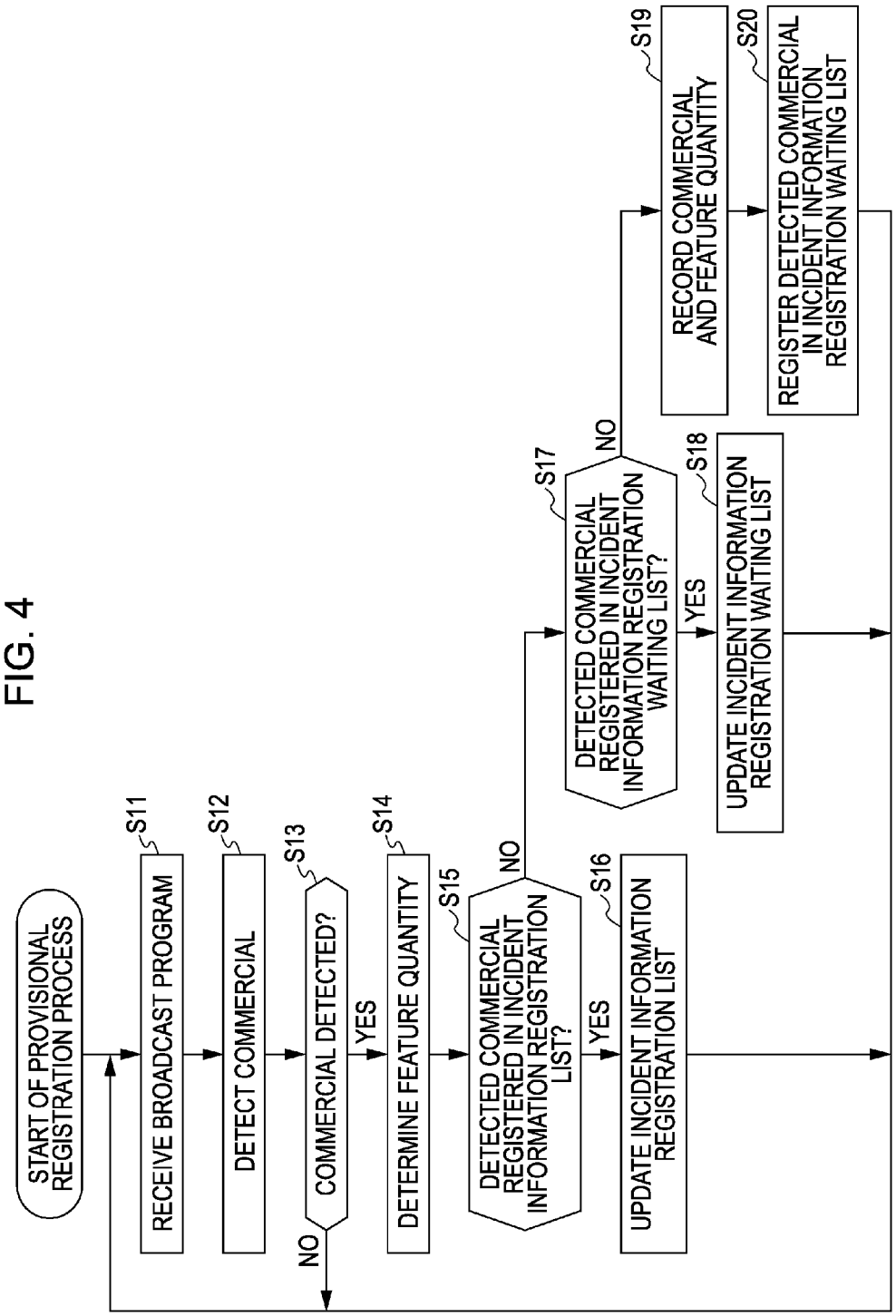
FIG. 4 is a flowchart illustrating a provisional registration process.

Returning to the flowchart of FIG. 4, the feature quantity of the commercial is determined in step S15. Based on the feature quantity supplied from the searcher 64, the register 63 determines whether the newly detected commercial is registered in the incidental information registration list.

The register 63 is supplied with a commercial 141 by the detector 61 and with a feature quantity 142 by the feature quantity calculator 62 as shown in FIG. 6. The register 63 compares the feature quantity 142 of the newly detected commercial 141 with the feature quantity of the commercial registered in the incidental information registration list. The register 63 thus determines whether the newly detected commercial is registered in the incidental information registration list.

As shown in FIG. 6, the database 21 records, in the incidental information registration list, commercials 143-1 through 143-4 and feature quantities 144-1 through 144-4 thereof. The register 63 thus compares the feature quantity 142 with each of the feature quantities 144-1 through 144-4. Since the feature quantity 142 equals the feature quantity 144-3, the commercial 141 is identical to the commercial 143-3. The register 63 determines that the detected commercial is already registered in the incidental information registration list.

Whether the commercial is registered or not is determined by comparing the determined feature quantity with the feature quantities of the commercials registered in the incidental information registration list. Alternatively, the commercial itself may be used to determine whether the commercial is registered.

Searching using the feature quantity outperforms searching using the commercial itself in terms of search process speed and memory capacity requirement. More specifically, an amount of data used in the search with a feature quantity serving as a key is substantially smaller than an amount of data that is used in the search with a commercial itself serving as a key. The use of the feature quantity achieves high-speed search. The technique of searching with the feature quantity is described in detail in Japanese Patent No. 3744464.

If it is determined in step S15 in the flowchart of FIG. 4 that the newly detected commercial is registered in the incidental information registration list, processing proceeds to step S16. In step S16, the register 63 updates the incidental information registration list recorded on the database 21 to modify the incidental information of the detected commercial. Processing returns to step S11 to repeat step S11 and subsequent steps.

The incidental information contains information indicating a period of the broadcast commercial, namely, indicates the date and time of first broadcasting of the commercial, the date and time of last broadcasting of the commercial, the broadcasting channel of the commercial, etc. The register 63 updates the information indicating the period of the broadcast commercial so that the date and time of last broadcasting become the date and time of the commercial detected in step S12. If there are a channel on which a new commercial has been broadcast, additional information, and updated information, the register 63 adds these pieces of information to update the incidental information.

If it is determined in step S15 that the newly detected commercial is not registered in the incidental information registration list, processing proceeds to step S17. Based on the feature quantity supplied from the feature quantity calculator 62, the register 63 determines whether the newly detected commercial is registered in the incidental information registration waiting list.

If it is determined in step S17 that the newly detected commercial is registered in the incidental information registration waiting list, processing proceeds to step S18. The register 63 updates the incidental information registration waiting list recorded on the database 21 to modify the incidental information of the detected commercial. Processing returns to step S11 to repeat step S11 and subsequent steps.

For example, the register 63 modifies the information indicating the period of the broadcast commercial so that the date and time of last broadcasting contained in the information indicating the period of the broadcast commercial becomes the date and time of the commercial detected in step S12. If there are a channel on which a new commercial has been broadcast, additional information, and updated information, the register 63 adds these pieces of information to update the incidental information.

If it is determined in step S17 that the newly detected commercial is not registered in the incidental information registration waiting list, in other words, the commercial is first detected, the register 63 supplies to the database 21 the commercial supplied from the detector 61 and the feature quantity supplied from the feature quantity calculator 62. Processing proceeds to step S19.

In step S19, the database 21 records the commercial and the feature quantity, supplied from the register 63.

In step S20, the register 63 registers the newly detected commercial in the incidental information registration waiting list recorded on the database 21. Processing returns to step S11 to repeat step S11 and subsequent steps.

More specifically, the register 63 supplies the newly detected commercial and the feature quantity to the database 21 for recording and registers the newly detected commercial in the incidental information registration waiting list. If broadcast data is supplied to the register 63 from the broadcast receiver 51 via the detector 61, the register 63 also supplies the broadcast data to the database 21 for recording, and then registers the broadcast data as part of incidental information to the incidental information registration waiting list.

Figure 7A:
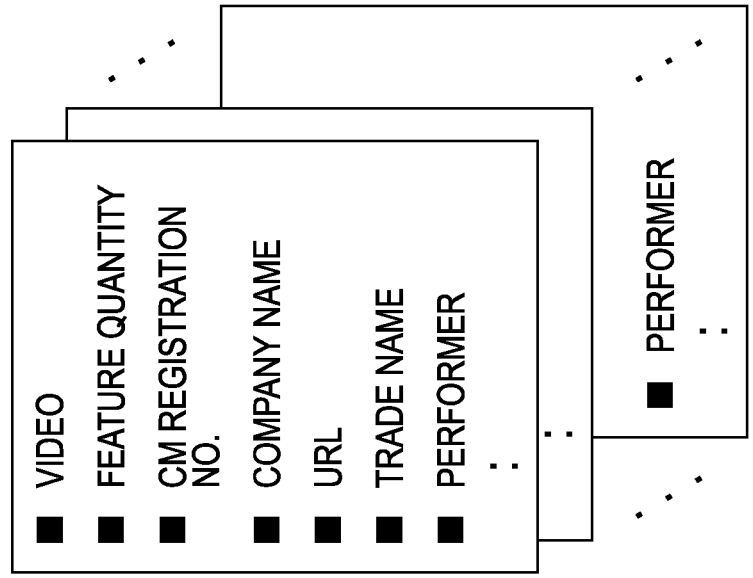
FIGS. 7A and 7B illustrate an incidental information registration list and an incidental information waiting list.

The database 21 records the incidental information registration waiting list of FIG. 7A, for example. The incidental information registration waiting list lists registration information on a per registered commercial basis. As shown in FIG. 7A, a single rectangle represents a single piece of registration information. The registration information contains a video signal for reproducing a commercial displayed in a text video, a feature quantity of the commercial displayed in text, and a provisional CM registration number indicated in text for uniquely identifying the commercial.

The registration information further contains, as the incidental information, text information indicating a company name, text information of a website URL, text information indicating a trade name of a product, and text information indicating a performer.

The incidental information registration waiting list thus contains the registration information on a per commercial basis. Each registration information contains the commercial, the feature quantity, the provisional CM registration number, and the incidental information. A small square is placed to the left of each information item to indicate the corresponding information is contained in the registration information. As shown in FIG. 7A, the squares placed to the left of the video and the feature quantity are different in color from the remaining squares, indicating that the registration information contains only the commercial and the feature quantity.

When each information contained in the registration information is recorded, the commercial represented by the registration information is registered in the incidental information registration list, and deleted in the incidental information registration waiting list. The database 21 records the incidental information registration list of FIG. 7B, for example. The registration information is listed on a per registered commercial basis in the incidental information registration list.

Figure 7B:
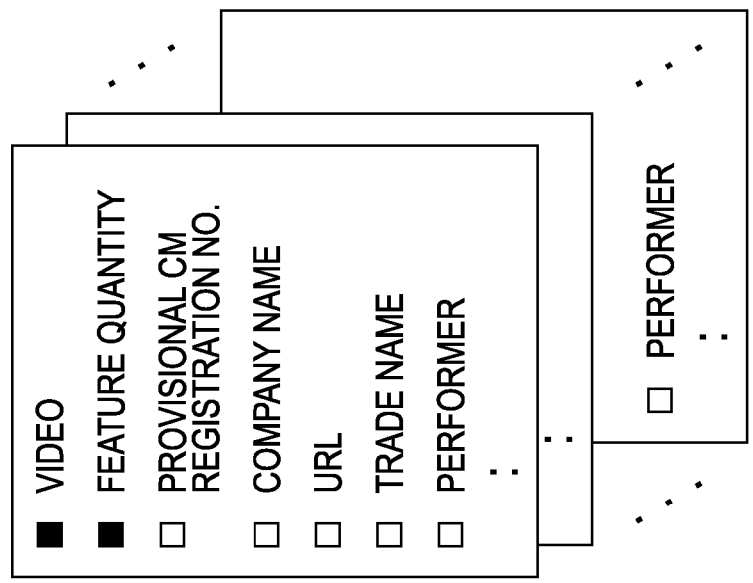

As shown in FIG. 7B, a rectangle represents a single piece of registration information. The registration information contains a commercial in text video, a feature quantity in text, a provisional CM registration number for uniquely identifying the commercial indicated in text, a company name in text, a trade name indicated in text as the incidental information, URL in text as the incidental information, and a performer name in text as the incidental information.

The incidental information registration list thus contains the registration information on a per commercial basis. Each registration information contains the commercial, the feature quantity, the provisional CM registration number, and the incidental information. A small square is placed to the left of each information item to indicate the corresponding information is contained in the registration information. As shown in FIG. 7B, the squares placed to the left of the information items are the same color for the "video" and the "feature quantity" of FIG. 7A, namely, all information items are contained in the registration information.

The database 21 records the incidental information registration waiting list and the incidental information registration list. Alternatively, a single list listing the registration information for each commercial may be provided. In such a case, the registration information may include a flag indicating whether the commercial is the one registered in the incidental information registration list. If the flag is set, the commercial of the registration information is registered in the incidental information registration list, and if the flag is reset, the commercial of the registration information is registered in the incidental information registration waiting list.

The server 12 detects a new commercial from the program broadcast from the broadcasting station 11, and then registers the commercial in the incidental information registration waiting list.

The new commercial is detected from the broadcast program, and then registered in the incidental information registration waiting list. Information regarding all commercials broadcast from the broadcasting station 11 is thus recorded.

When the newly detected commercial is registered in the incidental information registration waiting list, the server 12 acquires the incidental information of the commercial registered in the incidental information registration waiting list, and then registers in the incidental information registration list the commercial with the incidental information thereof obtained.

A registration process for registering the commercial in the incidental information registration list starts at the moment the new commercial is registered in the incidental information registration waiting list. Also, the registration process may be started when the operator of the server 12 issues an instruction to start the registration process or when a predetermined period of time has passed since last registration process.

The registration process of the server 12 is described below with reference to a flowchart of FIG. 8.

In step S41, the register 63 references the incidental information registration waiting list recorded on the database 21, thereby determining whether any commercial is registered in the incidental information registration waiting list.

If it is determined in step S41 that no commercial is registered, all detected commercials are registered in the incidental information registration list. The registration process thus ends.

If it is determined in step S41 that any commercial is registered, the register 63 acquires from the database 21 the commercial registered in the incidental information registration waiting list, and generates video data for displaying a list of commercials registered in the incidental information registration waiting list. The register 63 supplies the generated video data to the output controller 56. Processing proceeds to step S42.

In step S42, the output controller 56 supplies the video data from the register 63 to the output unit 57, thereby causing the output unit 57 to display the list of commercials registered in the incidental information registration waiting list.

The list of commercials of FIG. 9 is thus displayed on the output unit 57. Thumbnail images of the commercials registered in the incidental information registration waiting list are also displayed in the list of the commercials of FIG. 9.

A button 171 to display a list of commercials on a next page, and a button 172 to display a list of commercials on a previous page are also arranged in the list of the commercials. The buttons 171 and 172 are respectively labeled with a "next" candidate and a "previous" candidate.

The operator of the server 12 operates the buttons 171 and 172 to view successively the commercials registered in the incidental information registration waiting list. The operator may know that a new commercial has been detected from the list of commercials and select a thumbnail image of the commercial, and inputs the incidental information presented to the user.

When the thumbnail image is selected by the operator, the output unit 57 displays an incidental information input screen to input incidental information. More specifically, the register 63 acquires video data for displaying the incidental information input screen from the database 21 in response to a signal responsive to the operation of the operator input from the input unit 54 via the input controller 55, and then supplies the acquired video data to the output controller 56. The output controller 56 supplies the video data from the register 63 to the output unit 57, thereby displaying the incidental information input screen.

The output unit 57 displays the incidental information input screen of FIG. 10. The incidental information input screen of FIG. 10 includes a dialog box 191-1 for receiving a company name as the incidental information, a dialog box 191-2 for receiving the website URL as the incidental information, a dialog box 191-3 for receiving a trade name of a product as the incidental information, and a dialog box 191-4 for receiving a name of a performer as the incidental information.

The labels "company name," "URL," "trade name" and the "performer" are respectively arranged above the dialog boxes 191-1 through 191-4 in the incidental information input screen. The operator operates the mouse and the keyboard on the input unit 54 to input appropriate incidental information on each of the dialog boxes 191-1 through 191-4. The operator inputs the incidental information on the incidental information input screen of at least one commercial displayed on the list of FIG. 9.

When one thumbnail image displayed in the list of FIG. 9 is selected, the incidental information input screen may be displayed while the commercial represented by the thumbnail image is reproduced.

Returning to the discussion of the flowchart of FIG. 8, the list of commercials is displayed, the commercial is selected from the list and the incidental information is input. In step S43, the input controller 55 acquires a signal supplied from the input unit 54 in response to the operation of the user, thereby obtaining the input incidental information. The input controller 55 then supplies the acquired incidental information to the register 63.

In step S44, the register 63 supplies the incidental information supplied from the input controller 55 to the database 21 for recording. The database 21 records, as the incidental information of the commercial registered in the incidental information registration waiting list, the incidental information supplied from the register 63 with the commercial in association with the incidental information.

In step S45, the register 63 moves the commercial having the incidental information thereof input, from the incidental information registration waiting list to the incidental information registration list. More specifically, the register 63 assign a CM registration number for identifying the commercial to the commercial having the incidental information thereof input. The register 63 generates the registration information from the commercial with the CM registration number newly assigned to, the feature quantity of the commercial, and the input incidental information. The register 63 updates the incidental information registration list so that the generated registration information is contained in the incidental information registration list. In this case, the register 63 updates the incidental information so that the CM registration number assigned to the commercial is contained in the incidental information.

In step S46, the register 63 deletes, from the incidental information registration waiting list recorded on the database 21, the registration information of the commercial newly registered in the incidental information registration list. The register 63 thus deletes, from the incidental information registration waiting list, the commercial having the incidental information thereof input. The registration process thus ends.

The server 12 thus assigns the CM registration number to the commercial with the incidental information thereof input by the operator, and then registers the commercial to the incidental information registration list.

When the commercial having the incidental information thereof input is registered in the incidental information registration list, detailed information relating to the broadcast commercial is thus provided.

In response to the user operation, the client terminal 13 operated by the user requests the server 12 to transmit the CM information by specifying the identification information identifying the commercial as shown in FIG. 11. In response to the request from the client terminal 13, the server 12 updates the identification information as necessary, and then transmits at a time the CM information of the commercial obtained as a result of the search to the client terminal 13. The client terminal 13 receives the CM information from the server 12 and registers the received CM information in the incidental information registration list.

A CM information transmission process of the server 12 for transmitting the CM information composed of the feature quantity and the incidental information in response to the client terminal 13 is described below with reference to a flowchart of FIG. 12.

In step S71, the searcher 64 determines whether the transmission request requesting the transmission of the CM information has been received from the client terminal 13. If it is determined in step S71 that the transmission request has not been received, processing returns to step S71 to repeat step S71 until the transmission request has been received.

If it is determined in step S71 that the transmission request has been received, processing proceeds to step S72. The communication unit 58 receives the transmission request transmitted from the client terminal 13 via the communications network 14, and then supplies the received transmission request to the searcher 64.

In step S73, the searcher 64 extracts from the transmission request supplied from the communication unit 58 an identification condition for identifying the commercial of the transmission-requested CM information.

For example, the identification condition is a period of the broadcast commercial. The user operating the client terminal 13 specifies, as the identification condition, a desired period, thereby acquiring the CM information of the commercial broadcast during the specified period.

When the transmission request of preceding CM information was made one week ago, the CM information of the commercial might have been recorded. This transmission request specifies the immediately preceding one week as the target period to request the transmission of the CM information. Sufficient CM information is thus obtained.

The identification condition may include not only the period of the broadcast commercial but also information identifying the broadcasting station 11, namely, channel or a geographical area which the broadcasting station 11 covers in broadcasting service. By specifying the broadcasting station 11 as the identification condition, the user can obtain a commercial characteristic of the broadcasting station 11, for example, a commercial advertising the broadcasting station 11.

When the identification condition is extracted, the searcher 64 updates the identification condition as necessary in step S74. For example, the user may specify the immediately preceding two years as the target period even though only a record of CM information of the immediately preceding one year is available from the server 12. The server 12 cannot provide the CM information falling within a range from two years ago to one year ago. The searcher 64 modifies the target period in the identification condition to the immediately preceding one year period.

If the period specified in the identification condition is too long, the CM information to be transmitted to the client terminal 13 by the server 12 becomes an enormous amount of data. Workload on the server 12 can substantially increase. By shortening the period in such a case, the searcher 64 prevents an increase in workload on the server 12.

Any contract made between a provider of the CM information and a user may limit the target period within the user can use the CM information and the channel. The searcher 64 also modify the contract with the user in accordance with the period specified by the identification condition.

In step S75, the searcher 64 references the incidental information registration list recorded on the database 21, thereby searching for a commercial satisfying the identification condition. For example, the searcher 64 searches for a commercial as the one satisfying the identification condition, from among the commercials registered in the incidental information registration list. More specifically, the searcher 64 searches for the commercial first broadcast on the date and time falling within the period specified by the incidental information.

Each commercial is typically broadcast within a predetermined period of time. Depending on the identification condition specified by the user, the CM information that was received before by the client terminal 13 can be repeatedly received. Since any commercial that is first broadcast on the date and time within the period indicated by the identification condition is treated as satisfying the identification condition, the client terminal 13 is prevented from receiving repeatedly the same CM information.

When the commercial satisfying the identification condition is hit in the search, the searcher 64 acquires the CM information of all obtained commercials, namely, the incidental information and the feature quantity of each commercial from the database 21 and then supplies the CM information to the communication unit 58.

In step S76, the communication unit 58 transmits the CM information from the searcher 64 to the client terminal 13 via the communications network 14. Processing returns to step S71 to repeat step S71 and subsequent steps.

The server 12 searches for the commercial satisfying the identification condition and then transmits at a time the CM information of all commercial obtained as a result of search.

The commercial satisfying the identification condition is searched, and the CM information of all commercials obtained as a result is transmitted at a time. The information, desired by the user, regarding the commercial is easily provided.

The CM information of the commercials obtained as a result of search is transmitted to the client terminal 13 at a time. The client terminal 13 searches for and displays the incidental information of a desired commercial. The client terminal 13 is freed from accessing the server 12 at each search for incidental information. The number of accesses from the client terminal 13 to the server 12 and the number of searches on the server 12 are reduced. Workload imposed on the server 12 and the communications network 14 is thus reduced. The reduction in the workload on the server 12 and the communications network 14 frees the user from waiting for search results for a long time. The user can thus simply and quickly obtain desired information.

The video of each commercial (image and audio) has copyright protected. The transmission of the commercial itself from the server 12 to the client terminal 13 can violate the copyright law. By transmitting the feature quantity identifying the commercial and the incidental information related to the commercial desired by the user, an amount of data to be transmitted is reduced. The client terminal 13 receiving the feature quantity can identify and search for the commercial using the feature quantity.

A CM information reception process of the client terminal 13 for receiving the CM information is described below with reference to a flowchart of FIG. 13. The CM information reception process is started when the user requests the acquisition of the CM information, when a predetermined period of time has passed since CM information was acquired last, or when a predetermined number of commercials is registered in the incidental information registration waiting list.

In step S101, the register 114 determines the identification condition and produce a transmission request requesting the transmission of the CM information of a commercial satisfying the identification condition.

For example, when the user issues an instruction to acquire the CM information, the register 114 produces the transmission request in response to a signal supplied from the input unit 96 via the input controller 97. The transmission request includes the identification condition which may be defined by the broadcasting station 11 and the period of the broadcast commercial input by the user who operates the input unit 96. For example, CM information was acquired last one week ago. The user may specify the immediately preceding one week period as the identification condition.

The date and time on which the CM information was acquired last may be displayed. More specifically, the database 95 records information indicating the date and time on which the CM information was acquired last from the server 12. The register 114 obtains from the database 95 the information indicating the date and time on which the CM information was acquired last, and then supplies the information to the output unit 99 via the output controller 98. The output unit 99 displays last date and time of acquisition of the CM information based on the information supplied from the register 114. The user can thus obtain the CM information in a sufficient manner by displaying last date and time of the acquisition of the CM information.

The client terminal 13 may automatically produce the transmission request without any instruction from the user. The register 114 acquires the information regarding last date and time of the acquisition of the CM information from the database 95, determines the identification condition based on the acquired information, and then produces the transmission request.

Upon producing the transmission request, the register 114 supplies the produced transmission request to the communication unit 100. In step S102, the communication unit 100 transmits the transmission request from the register 114 to the server 12 via the communications network 14.

When the server 12 receives the transmission request from the client terminal 13, the CM information is transmitted from the server 12 to the client terminal 13. In step S103, the communication unit 100 receives the CM information from the server 12. The communication unit 100 also supplies the received CM information to the register 114. The register 114 supplies the CM information from the communication unit 100 to the database 95.

In step S104, the database 95 records the CM information supplied from the register 114.

In step S105, the register 114 updates the information recorded on the database 95 and indicating the date and time on which the CM information was acquired last.

In step S106, the register 114 registers in the incidental information registration list the commercial of the CM information newly received from the server 12.

As the server 12, the database 95 stores the incidental information registration waiting list and the incidental information registration list. The incidental information registration waiting list recorded on the database 95 contains the registration information on a per commercial basis. The registration information contains the feature quantity of the commercial, and the provisional CM registration number for uniquely identifying the commercial.

The incidental information registration list recorded on the database 95 contains the registration information on a per commercial basis. The registration information contains the feature quantity and the incidental information of the CM information. The incidental information of the commercial contains the CM registration number assigned to the commercial by the server 12.

Upon receiving the newly received CM information, the register 114 produces, as registration information of the commercial of the CM information, registration information containing the supplied CM information. The register 114 updates the incidental information registration list recorded on the database 95 so that the produced registration information is contained in the incidental information registration list. The commercial is thus registered in the incidental information registration list.

In step S107, the register 114 updates CM position information of the commercial, registered in the incidental information registration waiting list, from among commercials newly registered in the incidental information registration list.

The register 114 compares the feature quantity contained in the received CM information with the feature quantity contained in the registration information per commercial in the incidental information registration waiting list to search for the commercial having equal feature quantity. The register 114 thus searches for a commercial registered in the incidental information registration waiting list, from among commercials newly registered in the incidental information registration list.

When the commercial registered in the incidental information registration waiting list is hit in the search, the register 114 updates the CM position information of the same commercial as the one hit in the search, from among the commercials indicated by the CM position information registered on the database 95.

Figure 14:
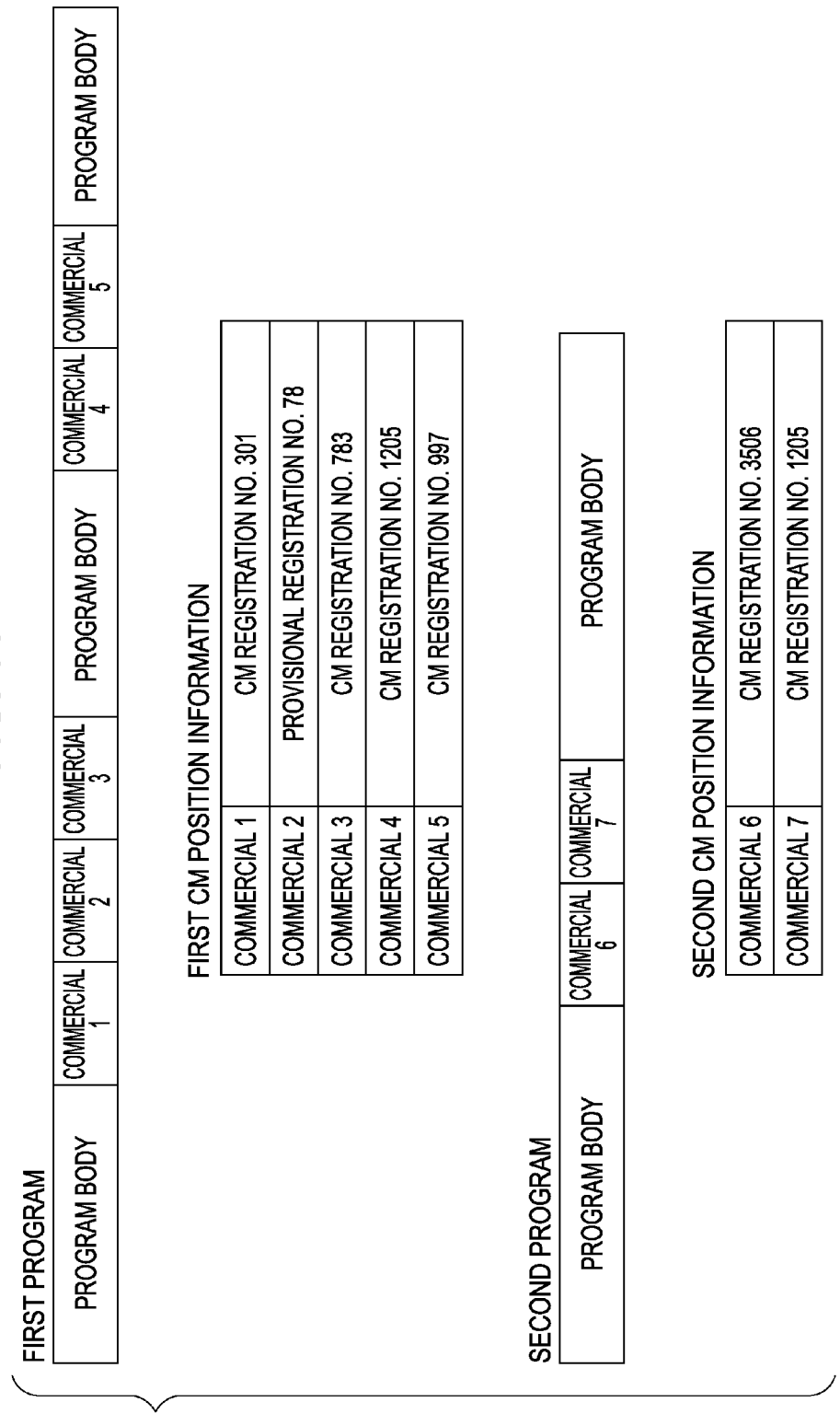
FIG. 14 illustrates commercial position information.

When the video recorder 93 records a first program as a video recorded program as shown in FIG. 14, the database 95 records first CM position information indicating a commercial contained in the first program.

In the example of FIG. 14, the first program contains five commercials of commercial 1 through commercial 5 in addition to a program body. The first CM position information contains positions of the commercial 1 through the commercial 5, namely, addresses of the commercials on the video recorder 93 and the CM registration numbers or the provisional CM registration numbers respectively identifying the commercial 1 through the commercial 5.

The first CM position information contains a CM registration number "301" of the commercial 1, a provisional CM registration number "78" of the commercial 2, a CM registration number "783" of the commercial 3, a CM registration number "1205" of the commercial 4, and a CM registration number "997" of the commercial 5.

Similarly, when the video recorder 93 records a second program as a video recorded program as shown in FIG. 14, the database 95 records second CM position information indicating a commercial contained in the second program.

The second program contains two commercials of commercials 6 and 7 in addition to a program body. The second CM position information contains positions of the commercials 6 and 7, namely, addresses of the commercials on the video recorder 93 and the CM registration numbers or the provisional CM registration numbers respectively identifying the commercials 6 and 7. The second CM position information contains a CM registration number "3506" of the commercial 6, and a CM registration number "1205" of the commercial 7.

Since the commercial 4 and the commercial 7 have the same CM registration number "1205," the two commercials are the same.

The database 95 records the first CM position information and the second CM position information shown in FIG. 14. The register 114 may search for a commercial registered in the incidental information registration waiting list, from among commercials newly registered in the incidental information registration list and hits the commercial having the provisional CM registration number "78."

The provisional CM registration number of the commercial 2 in the first CM position information is "78." The register 114 updates the first CM position information so that the CM registration number of the commercial 2 contained in the first CM position information is modified from the provisional CM registration number "78" to the CM registration number contained in the registration information of the commercial 2 contained in the incidental information registration list.

Returning to the discussion of the flowchart of FIG. 13, the register 114 deletes in step S108, from the incidental information registration waiting list, the registration information of the commercial newly registered in the incidental information registration list when the CM position information is updated. The CM information reception process thus ends.

The client terminal 13 receives, from the server 12, the CM information of the commercial satisfying the identification condition at a time.

The identification condition is specified and the CM information of the commercial satisfying the identification condition is received at a time from the server 12. This arrangement eliminates the need for the client terminal 13 to access the server 12 to search for the incidental information contained in the CM information. The user can simply and quickly obtain information regarding the commercial. Since the received CM information is recorded, the incidental information of the commercial can be searched even when the client terminal 13 is not connected to the communications network 14.

In the above discussion, the CM information of all commercials satisfying the identification condition is received at a time. Alternatively, CM information of the commercials satisfying the identification condition may be received piece by piece, or only a single piece of CM information of a commercial satisfying the identification condition may be received.

The user may cause the client terminal 13 to receive and record a program broadcast by the broadcasting station 11. In response to a user instruction to video record the program, in a commercial detection process, the client terminal 13 may video record the program, detect a commercial contained in the program, register the detected commercial in the incidental information registration waiting list, and produce the CM position information.

The commercial detection process of the client terminal 13 is described below with reference to a flowchart of FIG. 15.

In step S131, the broadcast receiver 91 receives the program broadcast by the broadcasting station 11 and supplies the received program to the recording and reproducing unit 111. When the program is transmitted in an analog signal from the broadcasting station 11, the broadcast receiver 91 converts the program in the analog video signal into a digital video signal and then supplies the digital video signal to the recording and reproducing unit 111. The recording and reproducing unit 111 supplies the program from the broadcast receiver 91 to each of the video recorder 93, the detector 112 and the feature quantity calculator 113.

In step S132, the video recorder 93 video-records the program supplied from the recording and reproducing unit 111.

In step S133, the detector 112 detects a commercial from the program supplied from the recording and reproducing unit 111. As in step S12 of FIG. 4, the detector 112 detects a period as a commercial candidate from the program based on the required condition, and selects the period of the commercial from the detected commercial candidates based on the incidental condition serving as a an indicator indicating the likelihood of commercial.

In step S134, the detector 112 determines whether a commercial has been detected. If it is determined in step S134 that no commercial has been detected, processing proceeds to step S142 with steps S135 through S141 skipped.

If it is determined in step S134 that a commercial has been detected, the detector 112 instructs the feature quantity calculator 113 to calculate a feature quantity. Processing proceeds to step S135.

In step S135, the feature quantity calculator 113 calculates a feature quantity of the detected commercial contained in the program supplied from the recording and reproducing unit 111 in response to the instruction from the detector 112, and then supplies the calculated feature quantity to the register 114. The feature quantity calculator 113 calculates the feature quantity of the commercial using the same method as the method of server 12 for calculating the feature quantity in step S14 of FIG. 4.

In step S136, the register 114 determines, based on the feature quantity supplied from the feature quantity calculator 113, whether the newly detected commercial is registered in the incidental information registration list. For example, the register 114 determines that the detected commercial is registered in the incidental information registration list if any of the feature quantities contained in the registration information in the incidental information registration list recorded on the database 95 is equal to the feature quantity from the feature quantity calculator 113.

If it is determined in step S136 that the detected commercial is registered in the incidental information registration list, processing proceeds to step S137. The register 114 produces the CM position information of the detected commercial. Processing proceeds to step S142.

For example, when the first program of FIG. 14 is video-recoded, the commercial 1 may be detected. The commercial 1 may be registered in the incidental information registration list, and the CM registration number contained in the incidental information of the commercial 1 may be "301," namely, the CM registration number for identifying the commercial 1 is "301." The register 114 then produces the CM position information containing the position of the recorded commercial 1 and the CM registration number "301" identifying the commercial 1, and then supplies the produced CM position information to the database 95. The database 95 records the CM position information supplied from the register 114.

When the commercial 3 is detected during the video recording of the first program of FIG. 14, the database 95 has already recorded the first CM position information indicating the commercial 1 and the commercial 2. The register 114 updates the first CM position information so that the position of the recorded commercial 3 and the CM registration number "783" identifying the commercial 3 are contained in the first CM position information.

If it is determined in step S136 that the detected commercial is not registered in the incidental information registration list, processing proceeds to step S138. Based on the feature quantity supplied from the feature quantity calculator 113, the register 114 determines whether the newly detected commercial is registered in the incidental information registration waiting list. If any of the feature quantities contained in the registration information in the incidental information registration waiting list recorded on the database 95 is identical to the feature quantity supplied from the feature quantity calculator 113, the register 114 determines that the detected commercial is registered in the incidental information registration waiting list.

If it is determined in step S138 that the detected commercial is registered in the incidental information registration waiting list, processing proceeds to step S139. The register 114 produces CM position information of the detected commercial. Processing proceeds to step S142.

The register 114 produces the CM position information containing the recorded position of the commercial and the provisional CM registration number identifying the commercial, and then supplies the produced CM position information to the database 95. The database 95 records the CM position information supplied from the register 114. When the commercial 2 is detected during the video recording of the first program of FIG. 14, the database 95 has already recorded the first CM position information indicating the commercial 1 contained in the first program. The register 114 updates the first CM position information so that the position of the recorded commercial 2 and the CM registration number "78" identifying the commercial 2 are contained in the first CM position information.

If it is determined in step S138 that the detected commercial is not registered in the incidental information registration waiting list, processing proceeds to step S140. The register 114 registers the detected commercial in the incidental information registration waiting list.

More specifically, the register 114 assigns a provisional CM registration number to the newly detected commercial. The register 114 updates the incidental information registration waiting list so that the provisional CM registration number and the registration information containing the feature quantity supplied from the feature quantity calculator 113 are contained in the incidental information registration waiting list recorded in the database 95.

In step S141, the register 114 produces the CM position information of the detected commercial and then supplies the produced CM position information to the database 95. More specifically, the register 114 produces the CM position information containing the provisional CM registration number assigned to the detected commercial and the position of the commercial recorded on the video recorder 93. The database 95 records the CM position information supplied from the register 114. Processing proceeds to step S142.

If it is determined in step S134 that no commercial is detected, or if the CM position information is produced in one of steps S137, S139 and S141, the recording and reproducing unit 111 determines in step S142 whether to end the video recording of the program. If it is determined in step S142 that the video recording is not to end, processing returns to step S131 to repeat step S131 and subsequent steps.

If it is determined in step S142 that the video recording is to end, the video recording ends. The commercial detection process thus ends.

In this way, the client terminal 13 video records the program while detecting the commercials contained in the program at the same time. The client terminal 13 registers the detected commercial in the incidental information registration waiting list as necessary, and produces the CM position information.

By registering the detected commercial in the incidental information registration waiting list and producing the CM position information, the client terminal 13 can associate a commercial contained in the video-recorded program with a commercial registered in one of the incidental information registration waiting list and the incidental information registration list. The client terminal 13 can reproduce only an commercial and display the incidental information of the commercial in response to a user operation. The user can thus easily obtain the incidental information of a desired commercial.

A user may wish to record only commercials. To meet such a user's demand, the commercial detection process may be performed with the program recording not performed. In the commercial detection process, only the detected commercial may be recorded and registered in the incidental information registration waiting list, and the CM position information may be produced.

Figure 16:
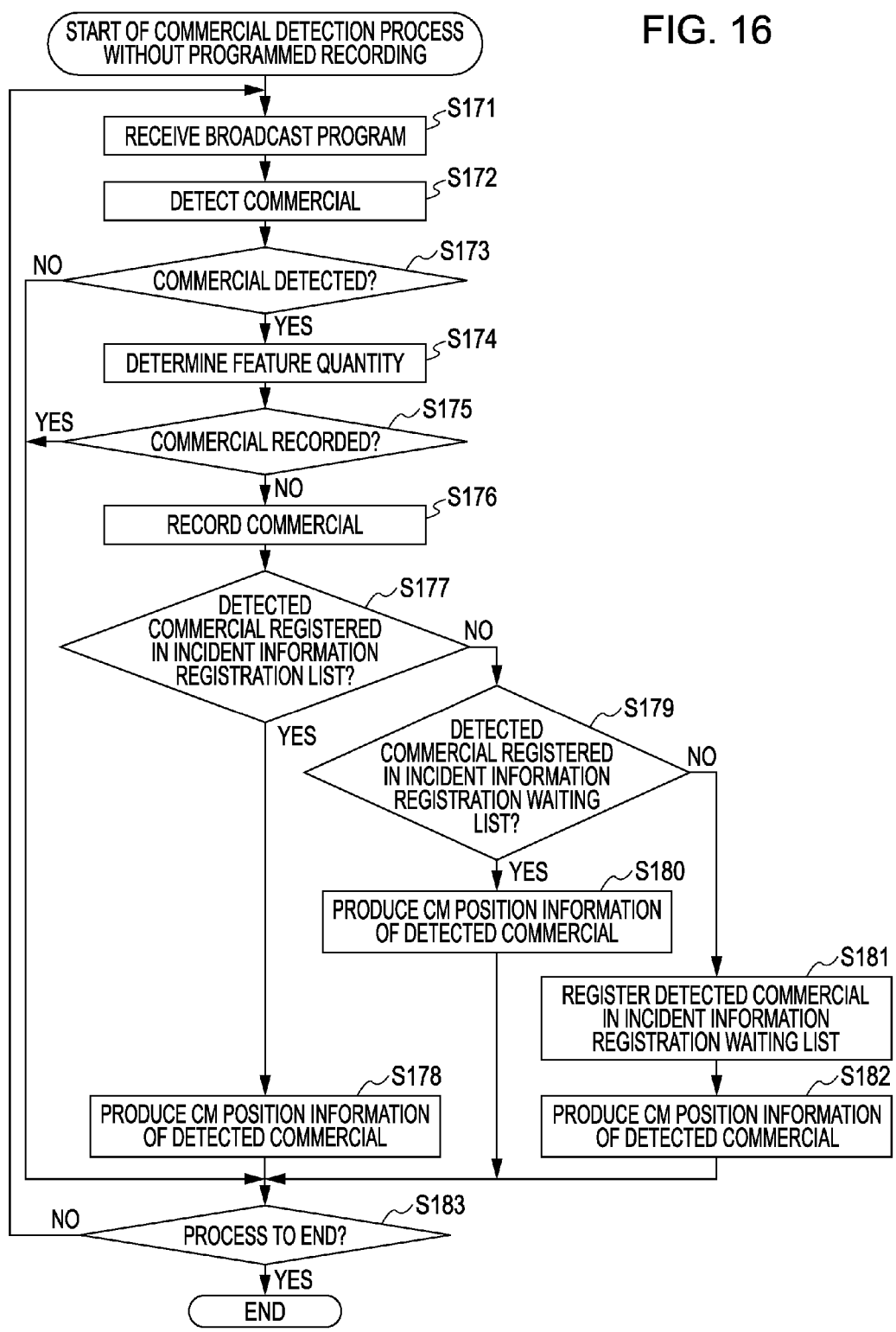
FIG. 16 is a flowchart illustrating a commercial detection process with television program unrecorded.

The commercial detection process with no program being recorded is described below with reference to a flowchart of FIG. 16. The commercial detection process is initiated when the user issues a start command or when a predetermined time is reached.

In step S171, the broadcast receiver 91 supplies the program broadcast from the broadcasting station 11 to the recording and reproducing unit 111. The recording and reproducing unit 111 supplies the program from the broadcast receiver 91 to each of the detector 112 and the feature quantity calculator 113.

Figure 15:
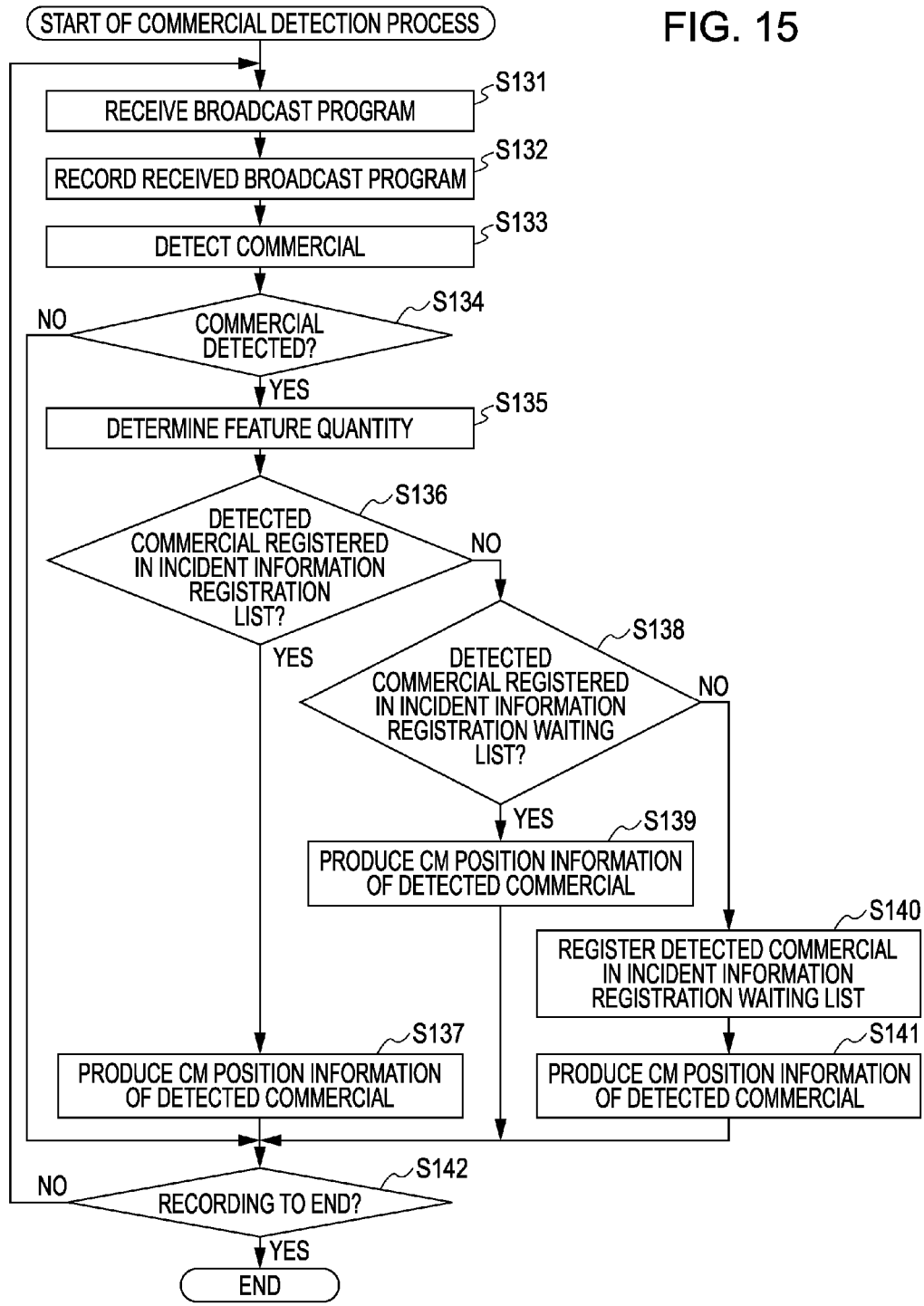
FIG. 15 is a flowchart illustrating a commercial detection process.

Next steps S172 and S174 are identical to steps S133 through S135 of FIG. 15, and the discussion thereof is omitted herein. In response to a request for the feature quantity, the feature quantity calculator 113 supplies the feature quantity to the register 114. The commercial detected by the detector 112 is thus supplied to the register 114.

In step S175, the register 114 determines whether detected commercial is recorded based on the feature quantity supplied from the feature quantity calculator 113. For example, the register 114 compares the commercial indicated by the CM position information, namely, the feature quantity of the commercial indicated by the CM registration number or the provisional CM registration number contained in the CM position information with the feature quantity supplied from the feature quantity calculator 113. If no feature quantity is identical to the feature quantity supplied from the feature quantity calculator 113, the register 114 determines that no identical commercial is registered.

If it is determined in step S175 that the identical commercial is registered, processing proceeds to step S183. If it is determined in step S175 that no identical commercial is registered, processing proceeds to step S176.

In step S176, the register 114 records the commercial by supplying the commercial from the detector 112 to the database 95. If the commercial is already registered in the incidental information registration waiting list or the incidental information registration list, the register 114 records the commercial in the registration information of the incidental information registration waiting list or the incidental information registration list.

The detected commercial may be recorded on the video recorder 93. By specifying the period of the commercial, the register 114 issues an instruction to cause the recording and reproducing unit 111 to record the commercial on the video recorder 93. In response to the instruction, the recording and reproducing unit 111 causes the video recorder 93 to record the commercial.

When the commercial is recorded, steps S177 through S182 are then performed. Steps S177 through S182, respectively identical to steps S136 through S141 of FIG. 15, are not discussed herein. When the commercial is recorded on the database 95, the recording position of the commercial indicated by the CM position information is an address in the database 95.

If it is determined in step S173 that no commercial is detected, if it is determined in step S175 that the commercial is recorded, or if it is determined in one of steps S178, S180 and S182 that the CM position information is produced, the register 114 determines in step S183 whether to end the process.

If it is determined in step S183 that the process is not to end, processing returns to step S171 to repeat step S171 and subsequent steps. If it is determined in step S183 that the process is to end, the commercial detection process ends.

Even when the program is not recorded, the client terminal 13 detects the commercial from the program, and records the unrecorded commercial.

The commercial is detected from the received program, and the unrecorded commercial is thus recorded. Only commercials not yet recorded on the client terminal 13 are recorded without the user's viewing the program.

Since a diversity of commercials are newly broadcast, the database 95 records a vast amount of CM information. Without appropriately deleting the CM information, the database 95 quickly runs out of available memory space. The client terminal 13 deletes the CM information when the user issues a deletion command to delete the CM information, when a predetermined period of time has passed since last CM information deletion process, or when an available memory space is lowered below a predetermined value.

Figure 17:
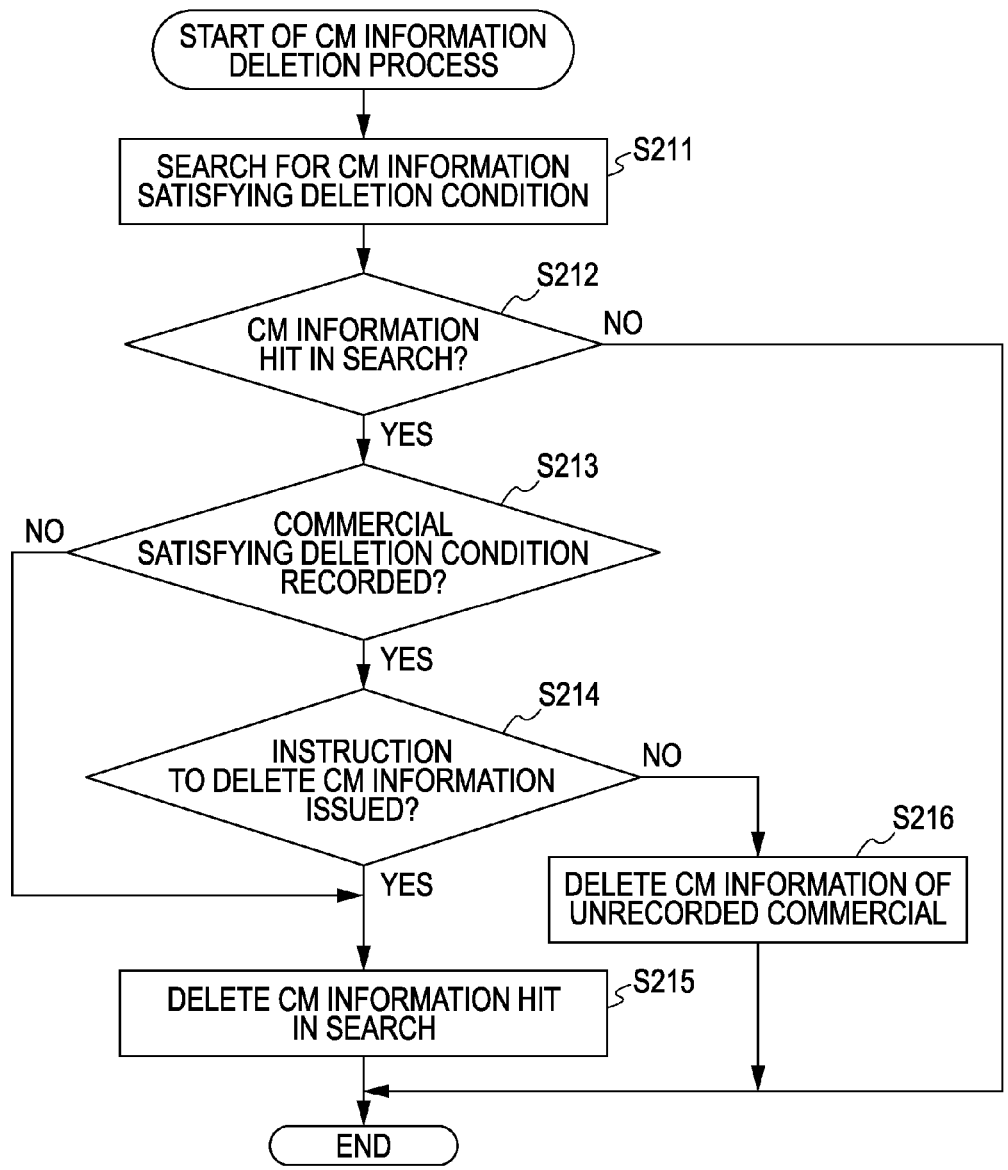
FIG. 17 is a flowchart illustrating a commercial information deletion process.

A CM information deletion process of the client terminal 13 for deleting the CM information is described below with reference to a flowchart of FIG. 17.

In step S211, the register 114 searches for the CM information matching a deletion condition identifying CM information to be deleted.

For example, the deletion condition may be defined by an elapsed time from the reception of the CM information from the server 12, an elapsed time from last referencing through searching, the number of hits in searching, or whether the commercial is contained in the recorded program.

More specifically, the deletion condition may contain the CM information that has aged for a predetermined period of time since the reception thereof from the server 12, the CM information of the commercial that has failed to be hit in a keyword searching, to be discussed later, for a predetermined period of time since the reception thereof from the server 12, or the CM information that has failed to be hit in the searching of the incidental information of the displayed commercials for a predetermined period of time since the reception thereof from the server 12.

The register 114 references the incidental information registration list recorded on the database 95 and searches for the CM information matching the deletion condition.

In step S212, the register 114 determines whether the CM information matching the deletion condition is hit. If it is determined in step S212 that the CM information is not hit, namely, if there is no CM information to be deleted, steps S213 through S216 are skipped. The CM information deletion process thus ends.

If it is determined in step S212 that the CM information is hit, processing proceeds to step S213. The register 114 determines whether the commercial of the CM information matching the deletion condition is recorded on the video recorder 93.

If it is determined in step S213 that the commercial is not recorded, processing proceeds to step S215.

If it is determined in step S213 that the commercial is recorded, processing proceeds to step S214. The register 114 determines whether the user has issued the instruction to delete the CM information of the commercial recorded on the video recorder 93.

If the deletion condition is the CM information that has aged by the predetermined period of time since the reception thereof from the server 12, the commercial of the CM information that is going to be deleted is contained in the program and thus recorded on the video recorder 93. If the CM information is deleted, the incidental information of the commercial cannot be displayed when the commercial is reproduced.

For example, when the CM information of the commercial identified by the CM registration number "997" is deleted with the first program of FIG. 14 recorded on the video recorder 93, the incidental information of the commercial 5 contained in the first program cannot be displayed.

The CM information of the commercial contained in the recorded program needs to be prevented from deleting. When the commercial of the CM information to be deleted is recorded, the output unit 99 displays a dialog for deleting the CM information of the commercial recorded on the video recorder 93. More specifically, the register 114 acquires video data for displaying a dialog from the database 95 and then supplies the acquired video data to the output controller 98. The output controller 98 supplies the video data from the register 114 to the output unit 99 for displaying the dialog.

For example, when the user selects a button in the dialog for deleting the CM information using the input unit 96, the register 114 determines in step S214 that the user has issued an instruction to delete the CM information.

If it is determined in step S214 that the instruction to delete the CM information has been issued, processing proceeds to step S215.

If it is determined in step S213 that the commercial is not recorded, or if it is determined in step S214 that the instruction to delete the CM information has been issued, the register 114 deletes in step S215 the CM information searched in step S211 from the incidental information registration list in the database 95. The CM information deletion process thus ends.

If it is determined in step S214 that the instruction to delete the CM information has not been issued, processing proceeds to step S216. The register 114 deletes the CM information of the commercial unrecorded on the video recorder 93, from among the CM information searched in step S211. The CM information deletion process thus ends.

If it is determined in step S213 that the commercial is recorded, processing may proceed to step S216 with step S214 skipped, or may proceed to step S215. The CM information of the commercial recorded may be deleted without any instruction from the user, or may remain recorded instead of being deleted.

The client terminal 13 searches for and deletes the CM information satisfying the deletion condition.

A sufficient available capacity is thus maintained in the database 95 by deleting the CM information satisfying the deletion condition, namely by deleting the CM information that is less likely to be continuously referenced hereinafter.

The user can view the received program or recorded program on the client terminal 13. When the user instructs the client terminal 13 to display the received program, the program received by the broadcast receiver 91 is output to the output unit 99 via the recording and reproducing unit 111 and the output controller 98 for viewing. When the user instructs the client terminal 13 to display the recorded program, the program recorded on the video recorder 93 is output to the output unit 99 via the recording and reproducing unit 111 and the output controller 98 for viewing.

The program supplied from one of the broadcast receiver 91 and the video recorder 93 to the recording and reproducing unit 111 is supplied to the detector 112 and the feature quantity calculator 113.

When viewing the program displayed on the output unit 99, the user may wish to know information regarding the commercial. The user can display the information regarding the commercial, namely the incidental information of the commercial on the client terminal 13 by operating a dedicated button for displaying the incidental information arranged on a keyboard or a remote commander as the input unit 96.

Figure 18:
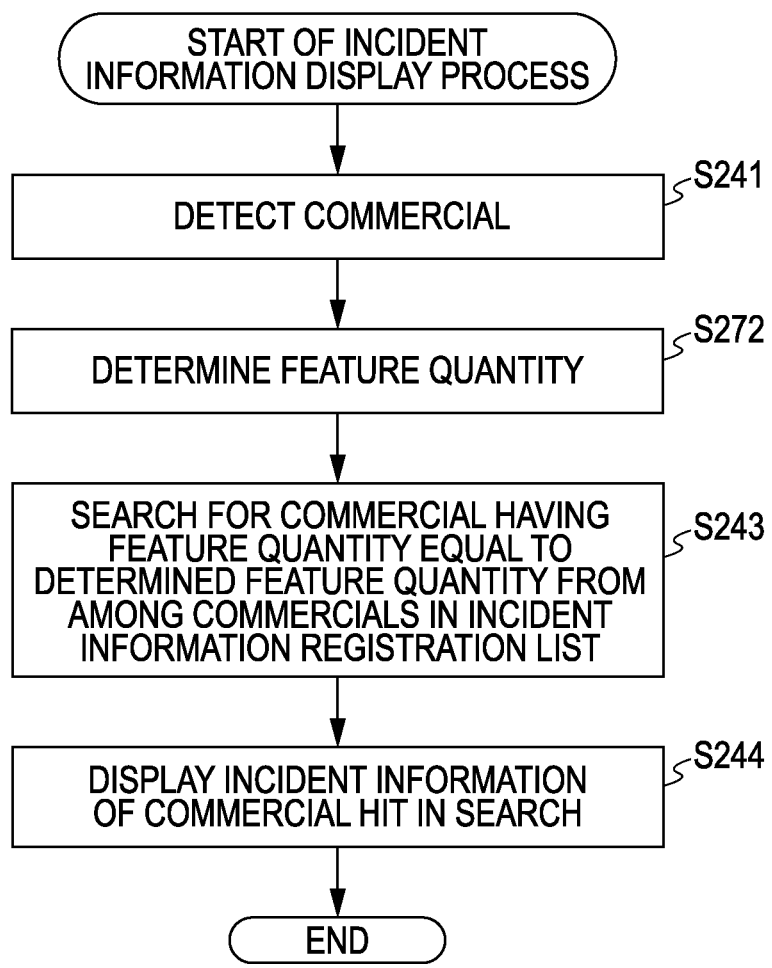
FIG. 18 is a flowchart illustrating an incidental information display process.

Upon receiving the display instruction of the incidental information, the client terminal 13 starts a incidental information display process. The incidental information display process of the client terminal 13 is described below with reference to a flowchart of FIG. 18.

In step S241, the detector 112 detects a commercial from a program supplied from the recording and reproducing unit 111 and instructs the feature quantity calculator 113 to calculate a feature quantity.

In response to the instruction from the detector 112, the feature quantity calculator 113 in step S242 calculates the feature quantity of the detected commercial contained in the program supplied from the recording and reproducing unit 111 and supplies the calculated feature quantity to the searcher 115.

In step S243, the searcher 115 references the incidental information registration list in the database 95 and searches for any commercial registered in the incidental information registration list having the feature quantity in the registration information matching the feature quantity supplied from the feature quantity calculator 113. More specifically, the searcher 115 searches for the incidental information of the detected commercial by searching for the commercial having the same feature quantity as the one determined. The searcher 115 acquires the incidental information of the commercial hit in the search and supplies the incidental information to the output controller 98.

In step S244, the output controller 98 supplies to incidental information of the commercial hit and supplied from the searcher 115 to the output unit 99 for displaying. The incidental information display process thus ends.

Figure 19:
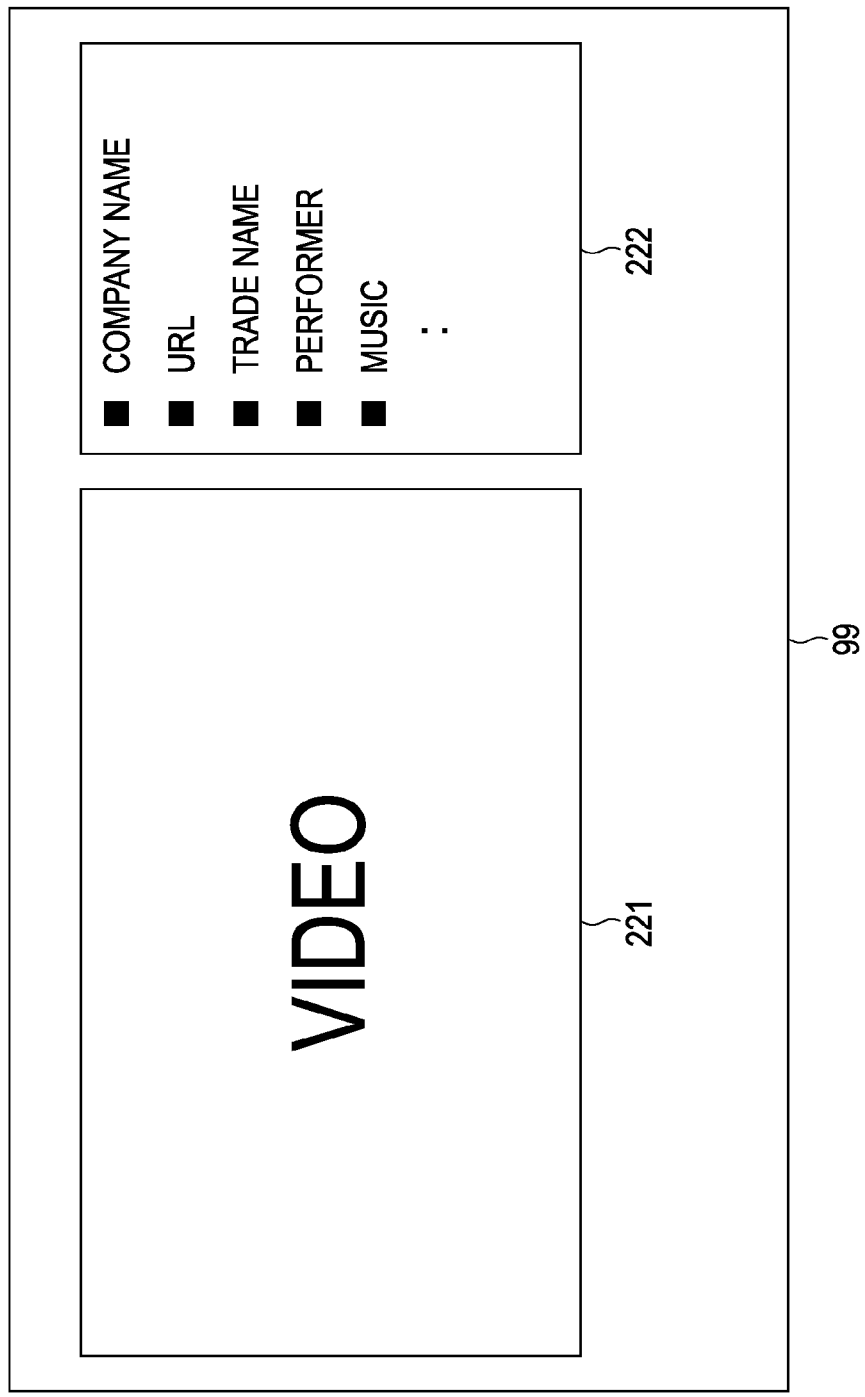
FIG. 19 illustrates a display example of incidental information.

The output unit 99 presents a screen of FIG. 19, for example. The screen includes a window 221 for displaying the program, namely, a program body and commercials, and a window 222 for displaying the incidental information of the commercial displayed in the window 221. As shown in FIG. 19, the window 222 displays the incidental information of the commercial displayed in the window 221, namely, a company name, a URL, a performer, and music in text.

The client terminal 13 displays in this way the incidental information of the displayed commercial in response to the instruction from the user.

While the commercial is displayed, the user can easily know the information regarding the commercial by displaying the incidental information of the commercial.

The incidental information display process is started in response to the instruction from the user. Alternatively, the incidental information display process may be automatically started when the program is displayed on the output unit 99. The incidental information display process may be repeated until the end of the production of the program. Alternatively, the incidental information display process may be performed in response to the commercial being displayed.

A predetermined condition such as a keyword input by the user and a period of the broadcast commercial may be set, and the client terminal 13 can display the commercial satisfying the predetermined condition and information regarding the commercial.

Figure 20:
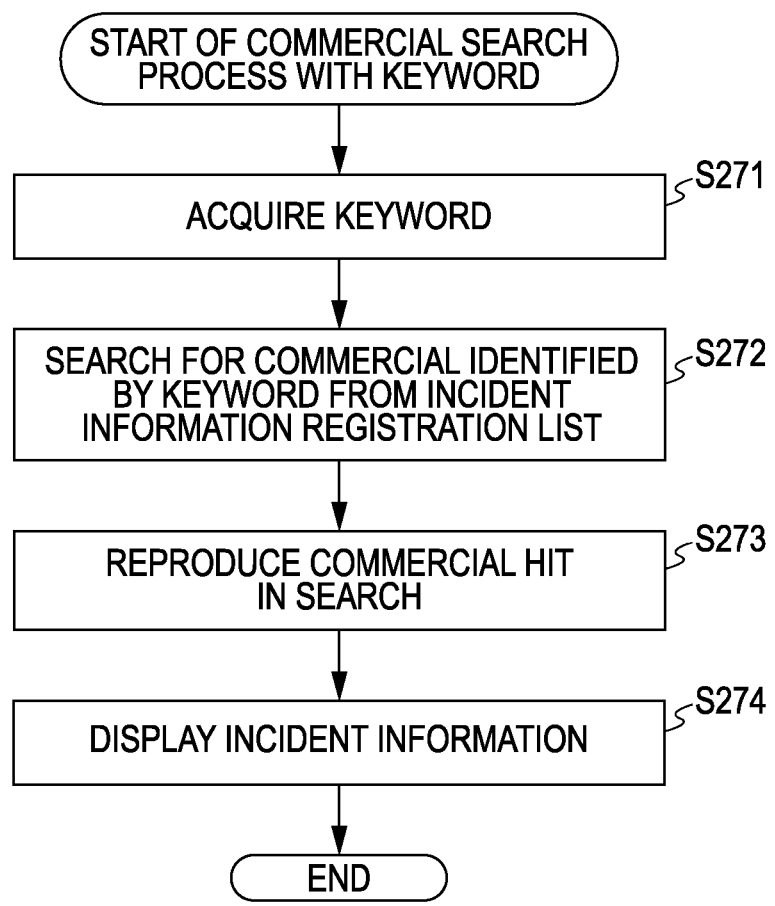
FIG. 20 is a flowchart illustrating a commercial search process with a keyword.

FIG. 20 is a flowchart illustrating a process that is performed in response to the input of keyword as a predetermined condition. In the process, the client terminal 13 searches for commercials in accordance with the predetermined condition, and then displays the commercial hit in the search and the incidental information of the commercial. The commercial detection process is initiated when the user inputs the keyword.

In step S271, the input controller 97 acquires a signal input to the input unit 96 by the user, thereby acquiring the input keyword and supplying the keyword to the searcher 115.

In step S272, the searcher 115 searches the incidental information registration list in the database 95 for a commercial in accordance with the keyword supplied from the input controller 97. For example, the user may enter a keyword "tea", and then the searcher 115 searches the incidental information registration list for a commercial having the incidental information containing the word "tea."

When the commercial identified by the keyword is hit in the search, the searcher 115 acquires the incidental information of the commercial from the database 95 and then supplies the incidental information to the output controller 98. The searcher 115 instructs the recording and reproducing unit 111 to reproduce the commercial hit in the search. If the commercial hit in the search is recorded in the database 95, the searcher 115 acquires the commercial from the database 95, and supplies the commercial to the recording and reproducing unit 111.

In step S273, the output unit 99 reproduces the commercial hit in the search. More specifically, in response to an instruction from the searcher 115, the recording and reproducing unit 111 acquires the commercial if the commercial is recorded in the video recorder 93 and then supplies the commercial to the output controller 98. The output controller 98 supplies the commercial from the recording and reproducing unit 111 to the output unit 99 for displaying.

In step S274, the output controller 98 supplies the incidental information from the searcher 115 to the output unit 99, thereby displaying the incidental information of the commercial currently being displayed. The commercial search process thus ends. The output unit 99 thus displays a screen of FIG. 21.

Figure 21:
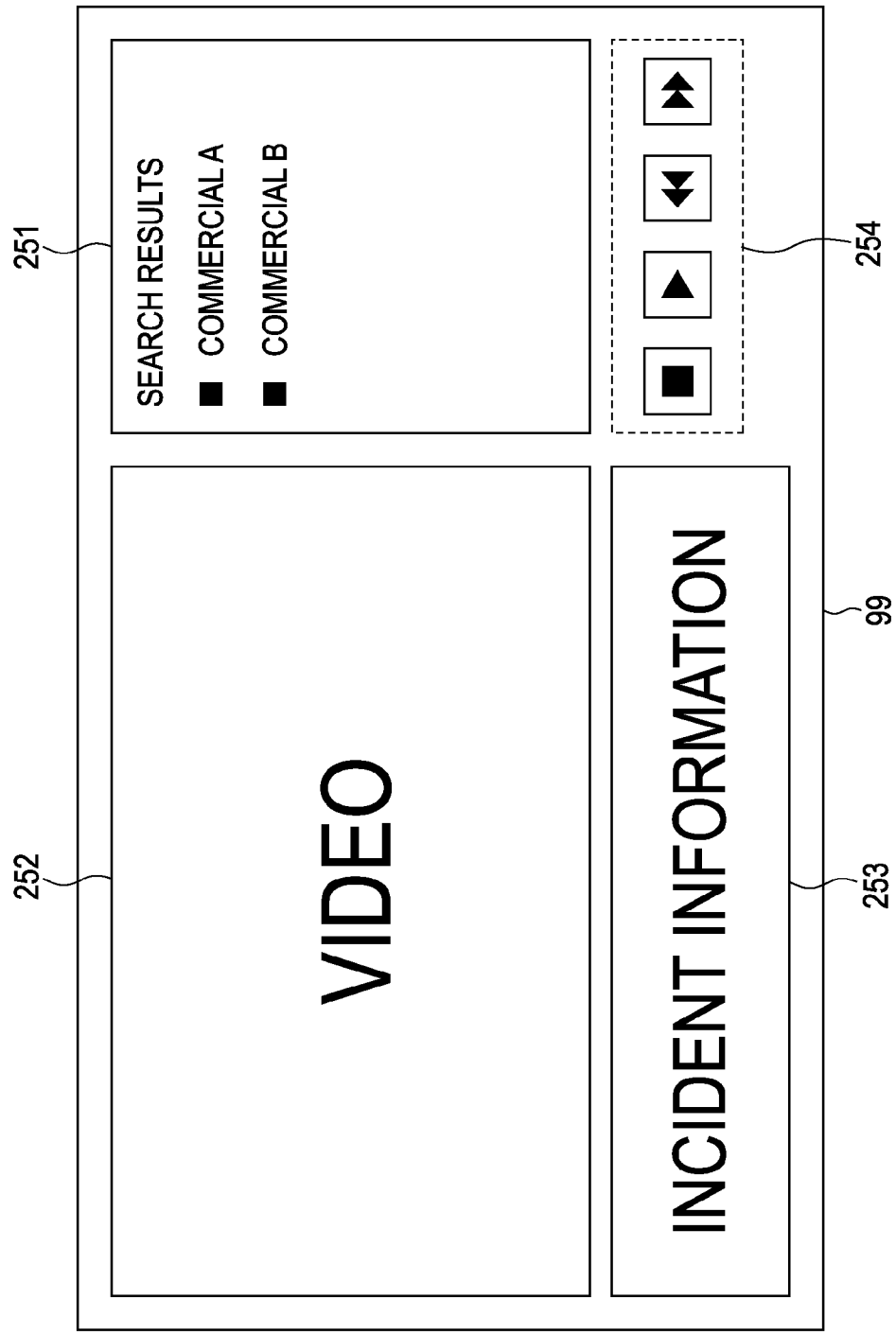
FIG. 21 illustrates a display example of search results of commercials.

The screen of FIG. 21 includes a window 251 displaying a list of commercials hit in the search, a window 252 displaying a commercial being reproduced, a window 253 displaying the incidental information of the commercial being reproduced, and a window 254 displaying buttons for controlling of the reproducing of the commercial.

As shown in FIG. 21, the window 251 displays commercial A and commercial B in text hit in the search. A square appears to the left of each commercial to indicate whether the corresponding commercial is recorded on the client terminal 13. If the commercial shown in text is not recorded on the client terminal 13, the square to the left of the commercial is shown in a different appearance.

By selecting the commercial in text displayed on the window 251, the user can reproduce the selected commercial. By selecting each button displayed in the window 254, the user can reproduce the commercial, stop reproducing the commercial, or reproduce a preceding commercial.

When the commercial hit in the search and reproduced is displayed in the window 252, the window 253 displays the incidental information of the commercial being reproduced. The user can easily know the information regarding the commercial, such as the trade name of a product being advertised, a name of a performer appearing in the commercial, and music used in the commercial.

The client terminal 13 searches for the commercials in accordance with the keyword, and displays the commercial hit in the search and the incidental information of the commercial.

The commercials are searched in accordance with the input keyword, and the commercial hit in the search and the incidental information of the commercial are displayed. By simply inputting the keyword, the user can search for a commercial in which a favorite performer, a commercial of a favorite company, etc. appears.

Figure 22:
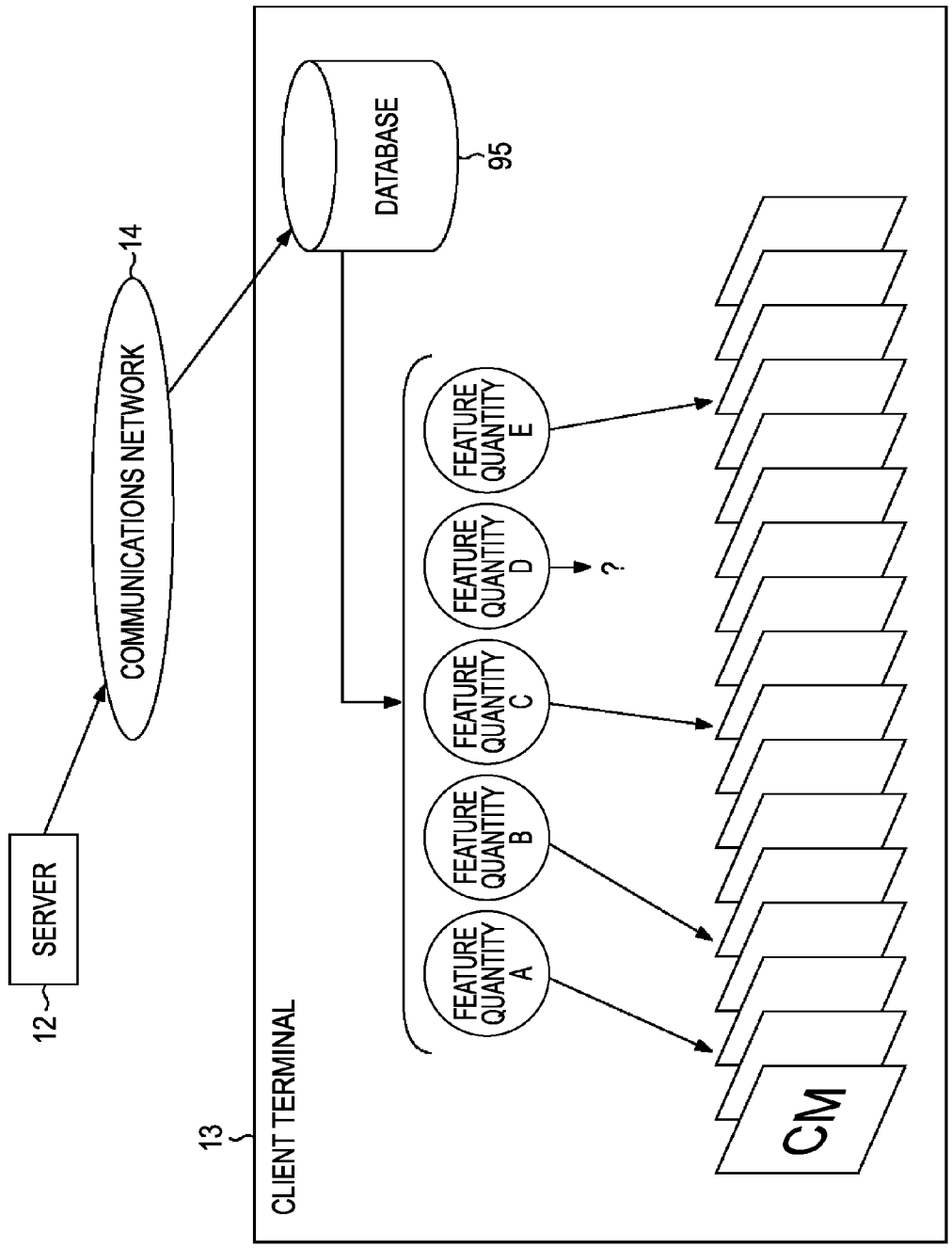
FIG. 22 illustrates commercials searched and recorded.

The video of the commercial hit in the search may not be recorded on the client terminal 13 in the commercial search process. The client terminal 13 acquires the CM information from the server 12 via the communications network 14 and then records the CM information as shown in FIG. 22. When a keyword is input, the client terminal 13 searches the CM information or the incidental information in the CM information recorded in the database 95 for the CM information containing a word matching the input key word. The client terminal 13 thus searches for a commercial identified by the keyword.

As a result of the search, five commercials are obtained as shown in FIG. 22. Feature quantities A through E are those of respective commercials. Rectangles shown below the feature quantities A through E represent commercials recorded in the client terminal 13.

As represented by arrow-headed lines, each of the feature quantities A through C and the feature quantity E is equal to at least one of the commercials in feature quantity, and these commercials are recorded in the client terminal 13. In other words, the database 95 records the CM position information having the CM registration number identifying the commercial hit in the search.

In contrast, the feature quantity D represented by an arrow-headed line fails to match the feature quantity of any of the commercials. This means that the corresponding commercial is not recorded in the client terminal 13. In other words, the CM information containing the CM registration number identifying hit in the search is not recorded in the database 95.

Figure 23:
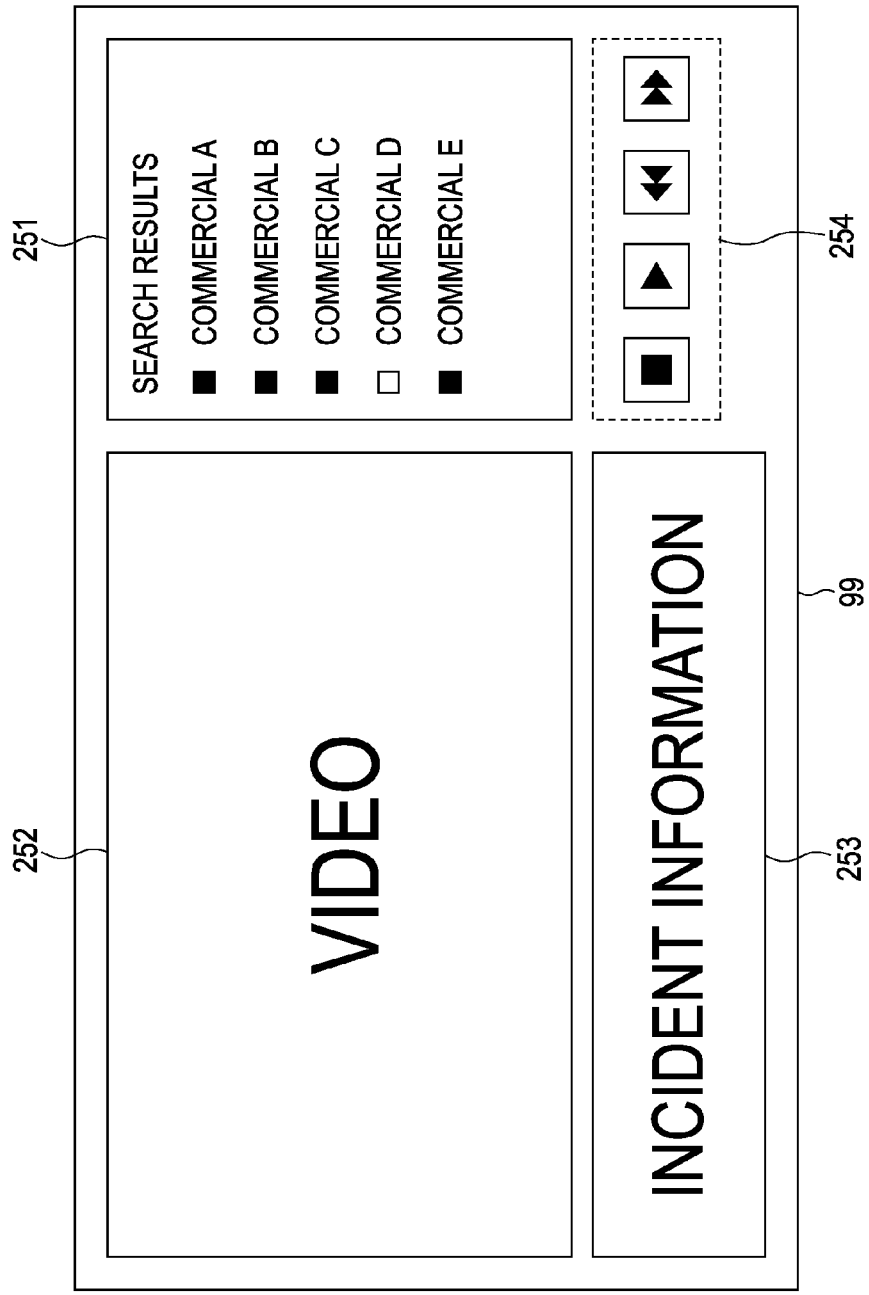
FIG. 23 illustrates a display example of commercial search results.

The commercial hit in the search may not be recorded in the client terminal 13. In such a case, the output unit 99 displays a screen of FIG. 23 after the commercial is hit in the search. In FIG. 23, elements identical to those shown in FIG. 21 are designated with the same reference numerals, and the discussion thereof is omitted herein.

As shown in FIG. 23, the window 251 includes "commercial A," "commercial B," "commercial C," "commercial D," and "commercial E" in text corresponding to the feature quantities A through E of FIG. 22.

Since the commercial D is not recorded in the client terminal 13, the square to the left of the commercial D is shown in a blank square different from solid squares of the other commercials.

Since the commercial D is not recorded in the client terminal 13, the user cannot reproduce the commercial D though the commercial D is searched. If the user selects the commercial D in the window 251, the output unit 99 displays a screen of FIG. 24.

Figure 24:
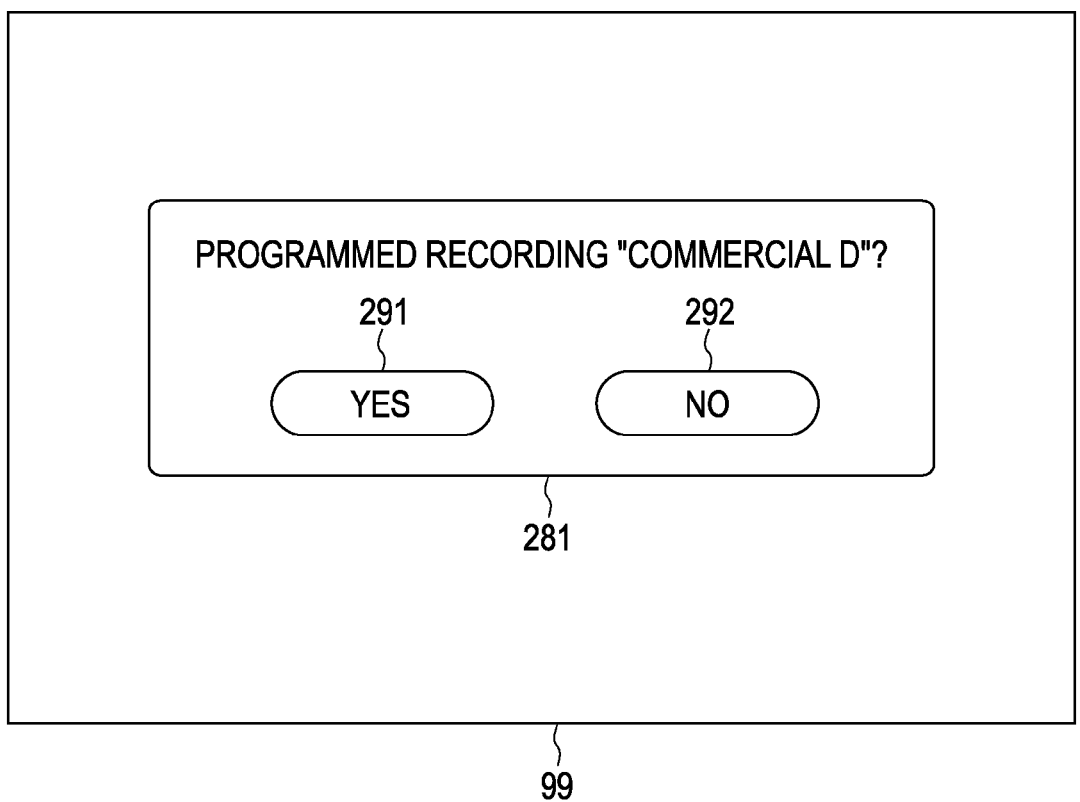
FIG. 24 illustrates a display example of a dialog.

As shown in FIG. 24, the output unit 99 displays a dialog 281 for programmed recording a commercial unrecorded in the client terminal 13. The dialog 281 displays a message reading "PROGRAMMED RECORDING 'COMMERCIAL D'?" to determine whether to perform programmed-recording process.

The dialog 281 includes a button 291 operated to input an instruction to programmed-record the commercial, and a button 292 operated to cancel the programmed-recording of the commercial. The button 291 and the button 292 are labeled "yes" and "no."

When the user selects the button 292, the dialog 281 is closed. The commercial D of FIG. 23 is not program-recorded. If the user selects the button 291, the commercial D of FIG. 23 is program-recorded. In this way, the client terminal 13 can program-record the commercial hit in the search but unrecorded in the client terminal 13.

Figure 25:
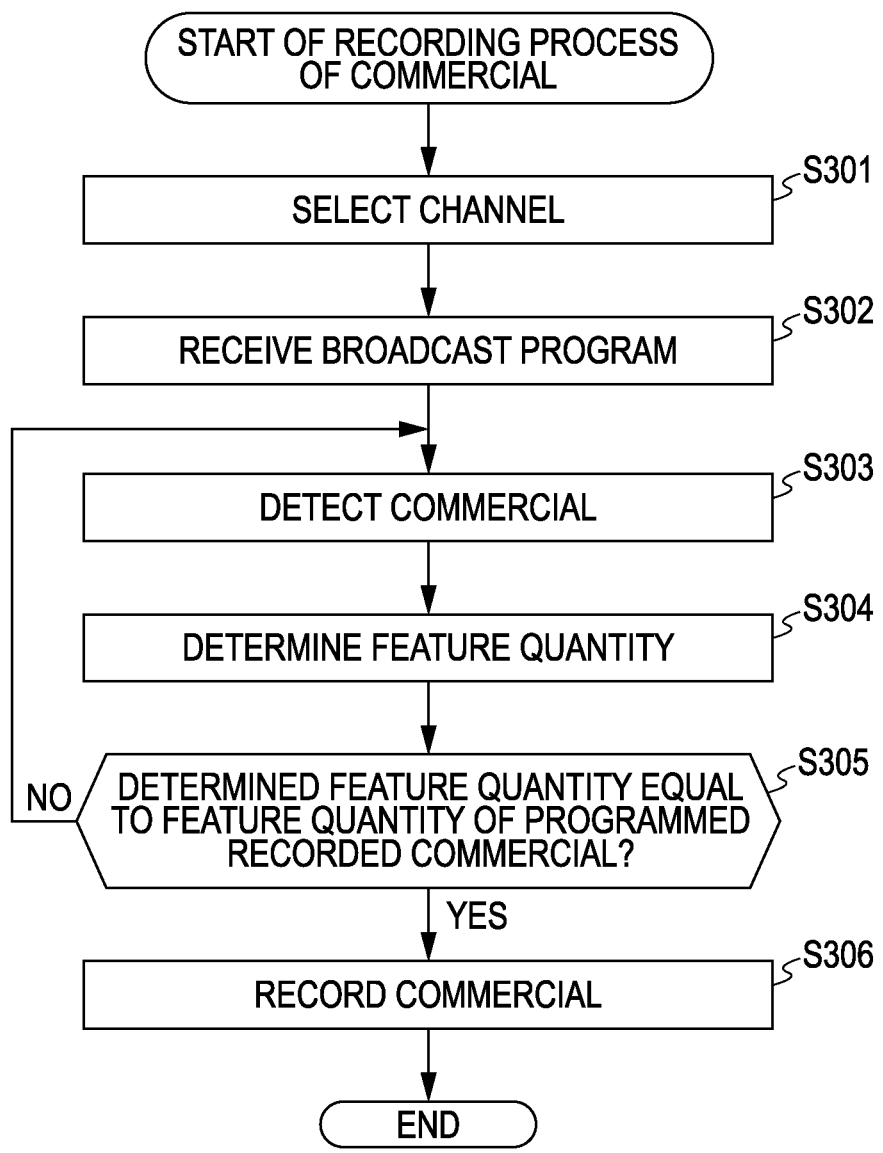
FIG. 25 is a flowchart illustrating a commercial video recording process.

A commercial recording process of the client terminal 13 is described below with reference to a flowchart of FIG. 25. In the commercial recording process, a commercial to be program-recorded is received and then recorded.

In step S301, the broadcast receiver 91 selects an appropriate channel for a commercial to be recorded. For example, a commercial is typically broadcast by a plurality of broadcasting stations. However, a broadcasting station's own commercial or a commercial of a particular program is not broadcast by other broadcasting stations. In such a case, it is necessary to identify a channel. The broadcast receiver 91 selects a receiving channel based the incidental information of the commercial. The commercial is efficiently recorded by selecting the receiving channel based on the incidental information.

If information regarding broadcast time of the commercial is contained in the incidental information, a time band for receiving the program may be determined based on the information. The commercial is thus efficiently recorded by setting the program receiving time band.

In step S302, the broadcast receiver 91 receives the program of the selected channel, and supplies the received program to each of the detector 112 and the feature quantity calculator 113 via the recording and reproducing unit 111.

In step S303, the detector 112 detects a commercial from the program supplied from the recording and reproducing unit 111. Upon detecting the commercial, the detector 112 extracts the detected commercial from the program and then supplies the extracted commercial to the register 114. The detector 112 instructs the feature quantity calculator 113 to calculate a feature quantity.

In step S304, in response to the instruction from the detector 112, the feature quantity calculator 113 calculates the feature quantity of the detected commercial contained in the program supplied from the recording and reproducing unit 111 and then supplies the calculated feature quantity to the register 114.

In step S305, the register 114 determines whether the calculated feature quantity matches the feature quantity of the commercial to be program-recorded. If it is determined in step S305 that the two feature quantities fail to match, processing returns to step S303 to repeat step S303 and subsequent steps. If it is determined in step S305 that the two feature quantities fail to match by a predetermined number of cycles, the program receiving channel or time band may be modified.

If it is determined in step S305 that the two feature quantities match, processing proceeds to step S306. In step S306, the register 114 records the commercial supplied from the detector 112. The commercial recording process thus ends.

The register 114 causes the database 95 to record the commercial so that the commercial is contained in the registration information of the incidental information registration list. When the commercial is recorded, the register 114 generates the CM position information indicating the recording position of the commercial and supplies the CM position information to the database 95 for recording. The commercial may be recorded in the video recorder 93. In such a case, the register 114 specifies the period of the commercial, and instructs the recording and reproducing unit 111 to record the commercial in the video recorder 93. In response to the instruction, the recording and reproducing unit 111 causes the video recorder 93 to record the commercial.

Figure 26:
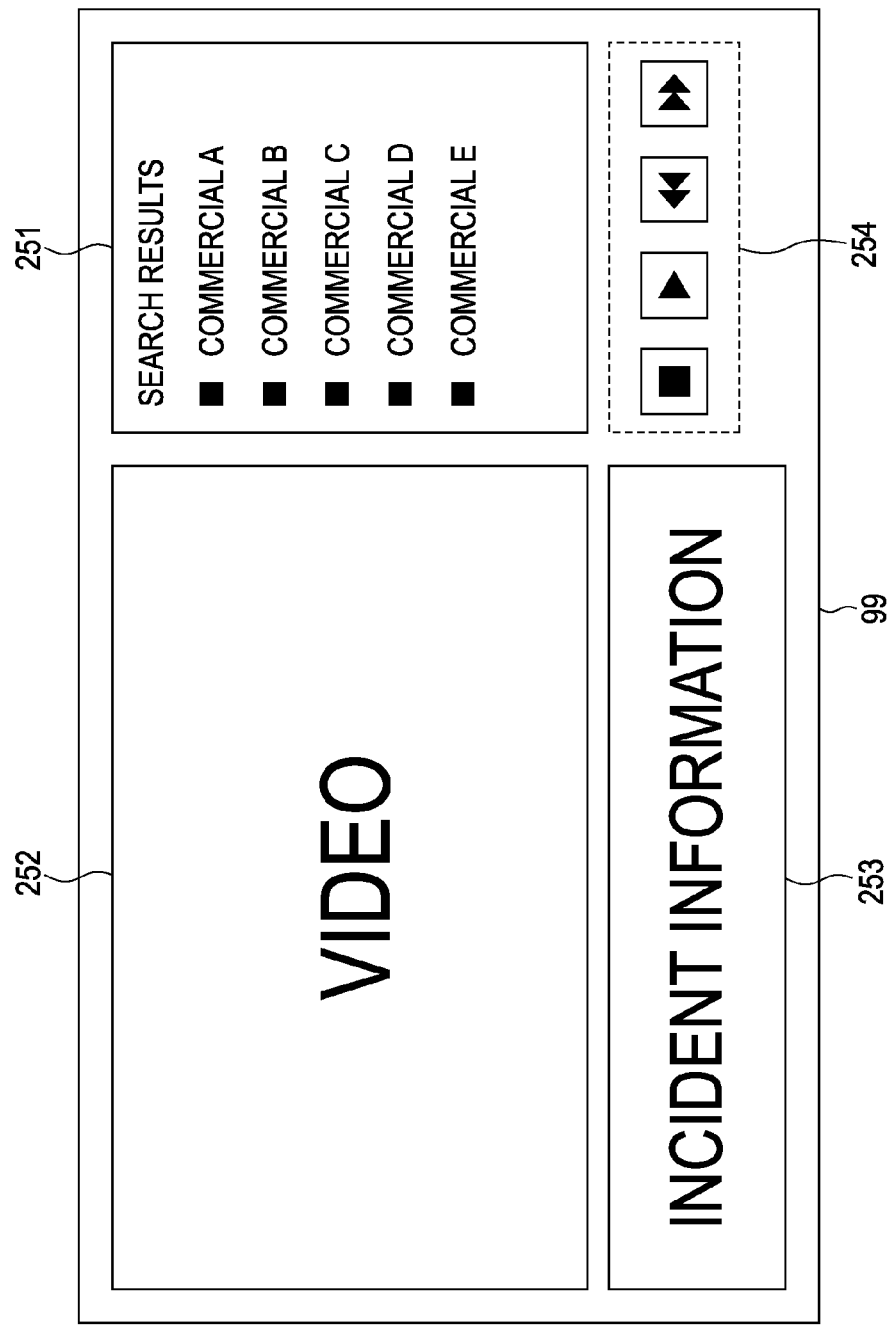
FIG. 26 illustrates a display example of commercial search results.

When the commercial is recorded, the square to the left of the commercial D recorded in a format different from the format of the squares of the other commercials becomes the same in the format as shown in FIG. 26. As shown in FIG. 26, the squares of the feature quantities A through E are the same in format. In this way, the commercial D can be reproduced for viewing.

The client terminal 13 thus receives and then records the commercial to be program-recorded.

By receiving and recording the commercial to be program-recorded, the user can record a commercial that could be broadcast at any unknown time at any unknown channel. The user can thus easily view a desired commercial.

The incidental information related to the commercial is input by the operator of the server 12. If disclosing of a list of commercials to a particular information provider leads to no problem, that particular information provider may input the incidental information.

Figure 27:
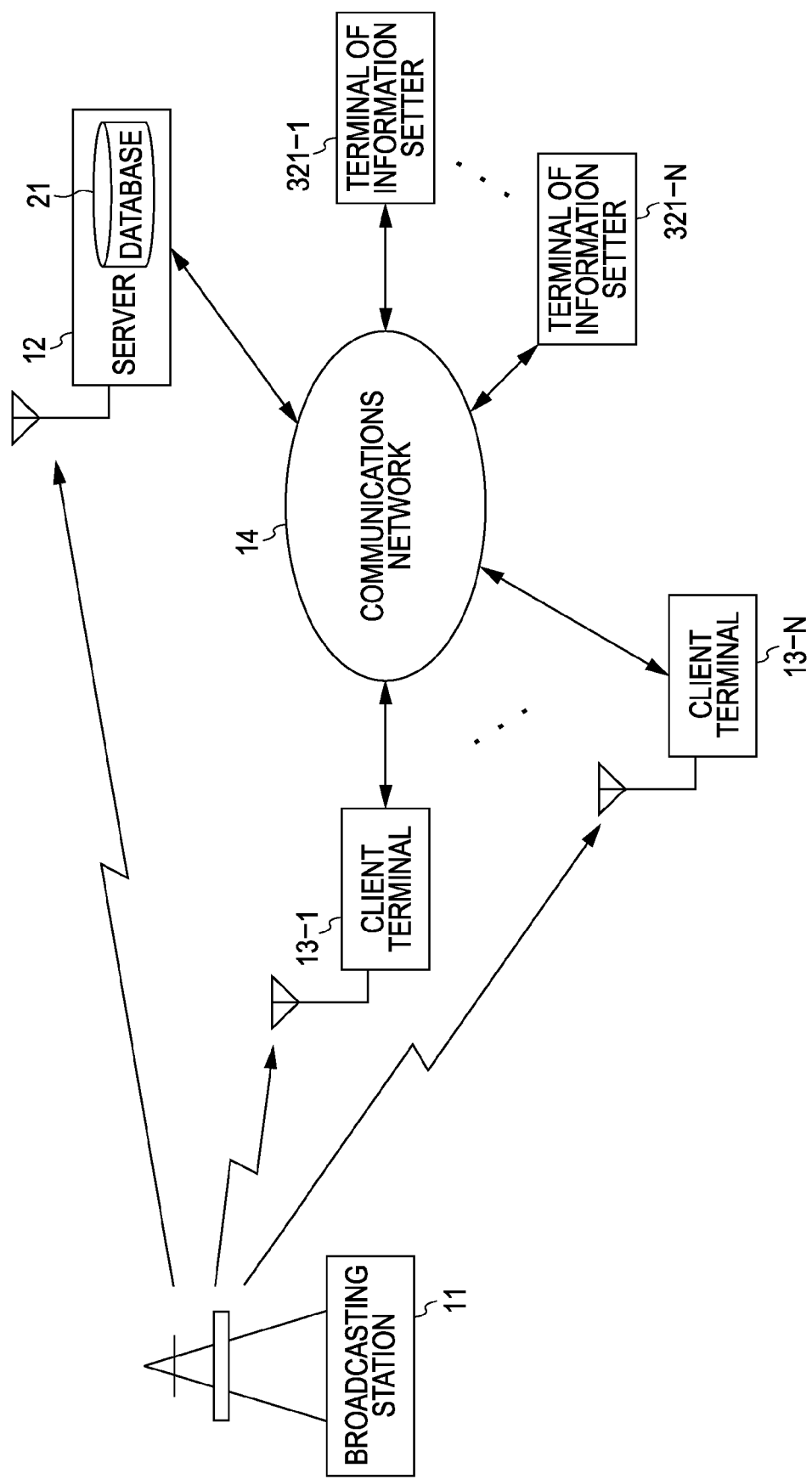
FIG. 27 illustrates a structure of another commercial information providing system.

In such a case, the CM information providing system may be arranged as shown in FIG. 27. In FIG. 27, elements identical to those illustrated in FIG. 1 are designated with the same reference numerals, and the discussion thereof is omitted herein.

The CM information providing system of FIG. 27 includes information setter terminals 321-1 through 321-N (information setter terminals 321-2 through 321-(N-1) are not shown) in addition to the system of FIG. 1. The information setter terminals 321-1 through 321-N are respectively connected to the server 12 via the communications network 14.

The server 12 discloses a list of commercials registered in the incidental information registration list via the communications network 14. Each of the information setter terminals 321-1 through 321-N transmits the incidental information, input by the respective information setter who has seen the list of commercials, to the server 12 via the communications network 14. Based on the incidental information received from each of the information setter terminals 321-1 through 321-N, the server 12 registers the commercial in the incidental information registration list.

If it is not necessary to discriminate the information setter terminals 321-1 through 321-N one from another, each of the terminals is simply referred to as an information setter terminal 321.

A registration process performed when the server 12 receives the incidental information from the information setter terminal 321 is described below with reference to a flowchart of FIG. 28. The registration process is initiated when a commercial is newly registered in the incidental information registration list, when a predetermined period of time has elapsed since last registration process, or when the information setter operating the information setter terminal 321 inputs an instruction to start the registration process.

In step S331, the register 63 references the incidental information registration waiting list recorded in the database 21, and determines whether any commercial is registered in the incidental information registration waiting list. If it is determined in step S331 that no commercial is registered in the incidental information registration waiting list, all detected commercials are registered in the incidental information registration list. The registration process thus ends.

If it is determined in step S331 that a commercial is registered in the incidental information registration waiting list, the register 63 acquires the commercial from the database 21, and produces video data for displaying a list of commercials registered in the incidental information registration waiting list. The register 63 supplies to the communication unit 58 the video data for displaying the list of commercials. Processing proceeds to step S332.

In step S332, the communication unit 58 presents the list of commercials registered in the incidental information registration waiting list. For example, the communication unit 58 presents the list of commercials by transmitting the video data to the information setter terminal 321 via the communications network 14.

Upon receiving the video data from the server 12, the information setter terminal 321 displays the list of commercials shown in FIG. 9, for example. The information setter selects a commercial about which the incidental information input screen is to be input, causes the incidental information input screen to be displayed, and enters the incidental information. The information setter terminal 321 transmits the input incidental information to the server 12 via the communications network 14.

Upon receiving the incidental information from the information setter terminal 321, the communication unit 58 supplies the received incidental information to the database 21 via the searcher 64 and the register 63. Steps S334 through S336, respectively identical to steps S44 through S46 of FIG. 8, are not discussed herein.

Upon receiving the incidental information from the information setter terminal 321, the server 12 registers the commercial in the incidental information registration list.

In this way, the incidental information is received from the information setter terminal 321, and the commercial is registered in the incidental information registration list. The incidental information is obtained from more information setters, and the user can more quickly obtain the incidental information.

Figure 29B:
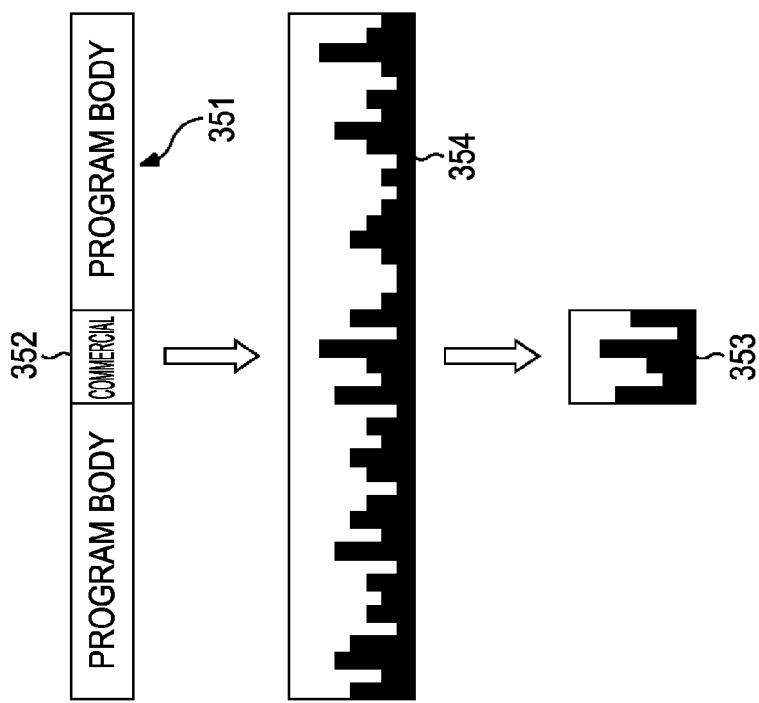
FIGS. 29A and 29B illustrate how to determine a feature quantity of a commercial.
Figure 29A:
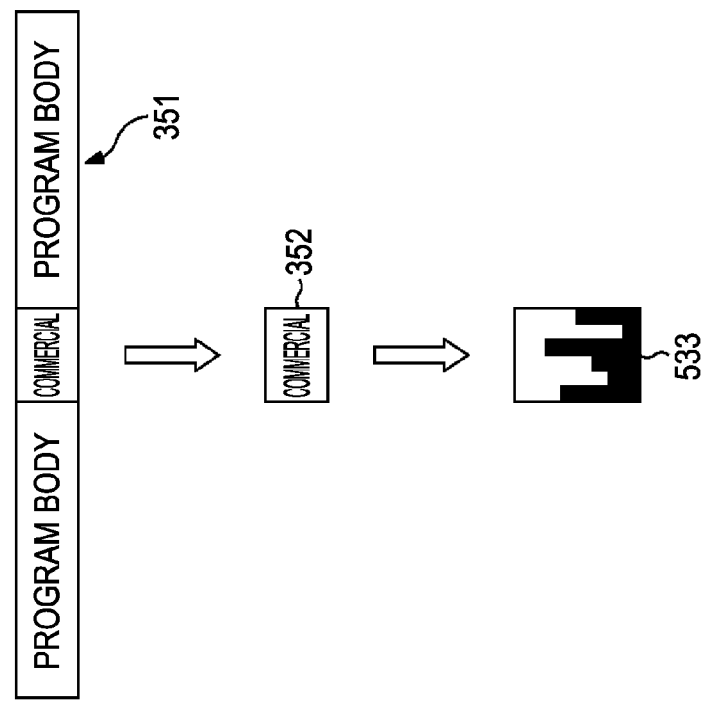

In the commercial detection process of the client terminal 13 previously discussed with reference to FIG. 15, a commercial 352 is extracted from a program 351 containing program bodies and the commercial 352, and a feature quantity 353 is calculated from the commercial 352 as shown in FIG. 29A. Alternatively, a feature quantity 354 of the program 351 may be calculated and the feature quantity 353 of the commercial 352 may be calculated from the feature quantity 354 as illustrated in FIG. 29B.

Figure 30:
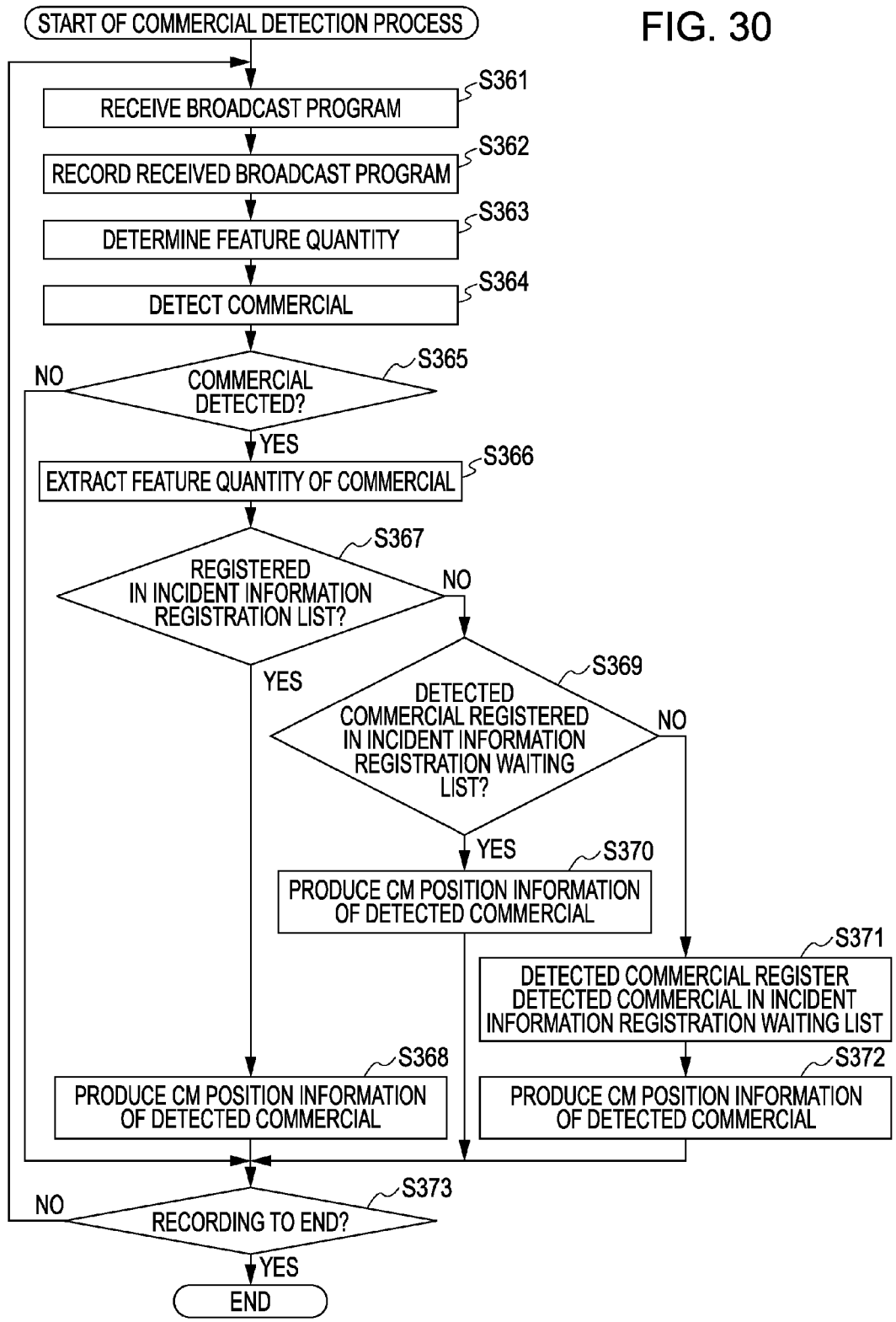
FIG. 30 is a flowchart illustrating a commercial detection process.

FIG. 30 is a flowchart of the commercial detection process in which the feature quantity of the program is calculated and then the feature quantity of the commercial is calculated from the feature quantity of the program.

Steps S361 and S362 are respectively identical to steps S131 and S132 of FIG. 15, and are not discussed herein.

In step S363, the feature quantity calculator 113 determines the feature quantity of the program supplied from the recording and reproducing unit 111. Next steps S364 and S365 are respectively identical to steps S133 and S134 of FIG. 15, and are not discussed herein.

If it is determined in step S365 that a commercial is detected, the detector 112 instructs the feature quantity calculator 113 to calculate the feature quantity of the commercial based on the position of the detected commercial. Processing proceeds to step S366.

In step S366, the feature quantity calculator 113 extracts the feature quantity of the commercial from the calculated feature quantity of the program in response to the instruction from the detector 112 and then supplies the calculated feature quantity to the register 114. Next steps S367 through step S373 are respectively identical to steps S163 through S142 of FIG. 15 and are not discussed here.

The client terminal 13 extracts the feature quantity of the commercial from the feature quantity of the program, registers the extracted commercial in the incidental information registration waiting list, and produces the CM position information.

In this way, the feature quantity of the commercial is calculated from the feature quantity of the program, the detected commercial is registered in the incidental information registration waiting list, and the CM position information is produced. The commercial contained in the recorded program is associated with the commercial registered in one of the incidental information registration waiting list and the incidental information registration list.

Similarly in the commercial detection process previously discussed with reference to FIG. 16, the feature quantity of the commercial may be calculated from the feature quantity of the program.

In the above discussion, the commercial detection process and the incidental information display process are performed on one of the program received by the client terminal 13 and the program recorded by the client terminal 13. Similarly, the commercial detection process and the incidental information display process may be performed on the program that is recorded on another apparatus different from the client terminal 13 such as a personal computer or a hard disk recorder and input to the client terminal 13 from the other apparatus via an input terminal arranged on the client terminal 13 and the communications network 14.

The commercial satisfying the identification condition is searched and the CM information of all commercials hit in the search is transmitted at a time. The information regarding the desired commercial can be provided at a time.

The identification condition is specified, and the CM information of the commercial satisfying the identification condition is received at a time. The user is freed from accessing the client terminal 13 each time the incidental information contained in the CM information is searched. The user can more easily and quickly obtain the information regarding the commercial.

The above-referenced series of process steps may be performed using hardware or software. If the process steps are performed using software, a program of the software may be installed from a recording medium onto a computer built in dedicated hardware or a general-purpose personal computer enabled to perform a variety of functions with a variety of programs installed thereon.

FIG. 31 is a block diagram of a personal computer 401 executing the above-referenced series of processes. A central processing unit (CPU) 411 of the personal computer 401 executes a variety of programs stored on one of a read-only memory (ROM) 412 and a recording unit 418. A random-access memory (RAM) 412 stores a program executed by the CPU 411 and data. The CPU 411, the ROM 412 and the RAM 413 are interconnected to each via a but 414.

An input-output interface 415 is connected to the CPU 411 via the bus 414. The input-output interface 415 connects to an input unit 416 composed of a keyboard, a mouse, a microphone, etc., and a output unit 417 composed a display, a loudspeaker, etc. The CPU 411 executes the variety of programs in response to an instruction input via the input 416. The CPU 411 also outputs process results to the output unit 417.

A recording unit 418, connected to the input-output interface 415, includes a hard disk and records the program executed by the CPU 411 and a variety of data. A communication unit 419 communicates with an external device via a network such as the Internet or a local-area network.

The computer program may be acquired via the communication unit 419 and recorded on the recording unit 418.

When a removable medium 431, such as a magnetic disk, an optical disk, a magneto-optical disk or a semiconductor memory A drive 420, is loaded on a drive 420 connected to the input-output interface 415, the drive 420 drives the loaded removable medium 431 and acquires a program and data recorded on the removable medium 431. The acquired computer program and data are transferred to the recording unit 418 for recording as necessary.

As shown in FIG. 31, a recording medium records the program installed and executed on the computer. The recording media include the removable medium 431 as a package medium, such as one of a magnetic disk (including a flexible disk), an optical disk (such as compact disk read-only memory (CD-ROM)), or digital versatile disk (DVD)), and a semiconductor memory. The recording media also include the ROM 412 or a hard disk such as the recording unit 481, each permanently or temporarily storing the program. The storage of the program onto the program recording medium may be performed using the communication unit 419 serving as an interface such as a router or a modem via a wired communication medium or a wireless communication medium including a local area network, the Internet, or a digital broadcasting satellite.

The process steps describing the program stored on the recording medium may be performed in the time-series order sequence as previously stated. Alternatively, the process steps may be performed in parallel or separately.

In this specification, the word system refers to an entire system including at least one apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising a first information processing apparatus and a second information processing apparatus, connected to each other via a communication network,
   (1) the first information processing apparatus including:
      a first detector configured to detect a first commercial message contained in a broadcast television program,
      a first feature quantity calculator configured to calculate a feature quantity of the detected first commercial message, the first feature quantity calculator calculating the feature quantity of the detected first commercial message based on an analysis of pixels in images of the detected first commercial message,
      a first storage configured to store incidental information relating to the detected first commercial message and the feature quantity of the detected first commercial message,
      a first searcher configured to search for a commercial message satisfying an identification condition, from among commercial messages detected at the first information processing apparatus, the identification condition including at least a period within which the commercial message has been broadcast, and
      a first communication unit configured (i) to receive a transmission request from the second information processing apparatus, the transmission request requesting transmission of a feature quantity and incidental information of the commercial message satisfying the identification condition, and (ii) to transmit feature quantities and incidental information of all messages satisfying the identification condition obtained as a result of the search to the second information processing apparatus; and
   (2) the second information processing apparatus including:
      a second communication unit configured to transmit the transmission request to the first information processing apparatus and to receive the incidental information and the feature quantities transmitted from the first information processing apparatus,
      a second storage configured to store the received incidental information and the received feature quantities,
      a second detector configured to detect a second commercial message contained in a broadcast television program,
      a second feature quantity calculator configured to calculate a feature quantity of the detected second commercial message, the second feature quantity calculator calculating the feature quantity of the detected second commercial message based on an analysis of pixels in images of the detected second commercial message, and
      a second searcher configured to search for incidental information of the detected second commercial message by searching the stored feature quantities on the second storage for a stored feature quantity that matches the feature quantity of the detected second commercial message, wherein the incidental information of the detected second commercial message corresponds to incidental information of a commercial message having the matching feature quantity.

2. The information processing apparatus according to claim 1, wherein the identification information further includes information of a broadcast station.

3. The information processing apparatus according to claim 1, further comprising:
   an acquisition unit configured to acquire the incidental information of the detected first commercial message, the incidental information of the detected first commercial message being input by an operator of the first information processing apparatus.

4. One or more non-transitory computer readable media having stored thereon computer executable program instructions for performing functions including:
   (1) at a first information processing apparatus:
      (a) detecting a first commercial message contained in a broadcast television program,
      (b) calculating a feature quantity of the detected first commercial message, the feature quantity of the detected first commercial message being calculated based on an analysis of pixels in images of the detected first commercial message,
      (c) storing incidental information relating to the detected first commercial message and the feature quantity of the detected first commercial message,
      (d) searching a commercial message satisfying an identification condition, from among commercial messages detected at the first information processing apparatus, the identification condition including at least a period within which the commercial message has been broadcast,
      (e) receiving a transmission request from a second information processing apparatus, the transmission request requesting transmission of a feature quantity and incidental information of the commercial message satisfying the identification condition, and
      (f) transmitting feature quantities and incidental information of all messages satisfying the identification condition obtained as a result of the search to the second information processing apparatus; and
   (2) at the second information processing apparatus:
      (a) receiving the incidental information and the feature quantities transmitted from the first information processing apparatus in response to the transmission request,
      (b) storing the received incidental information and the received feature quantities,
      (c) detecting a second commercial message contained in a broadcast television program,
      (d) calculating a feature quantity of the detected second commercial message, the feature quantity of the detected second commercial message being calculated based on an analysis of pixels in images of the detected second commercial message, and
      (e) searching for incidental information of the detected second commercial message by searching the stored feature quantities for a stored feature quantity that matches the feature quantity of the detected second commercial message, wherein the incidental information of the detected second commercial message corresponds to incidental information of a commercial message having the matching feature quantity.

5. The information processing system according to claim 1, wherein the second information processing apparatus further includes:
a display configured to display the incidental information of the detected second commercial message to a user at the second information processing apparatus.

6. The information processing system according to claim 1, wherein:
the first information processing apparatus further includes a first register configured (i) to determine whether the detected first commercial message is registered at the first information processing apparatus based on the feature quantity of the detected first commercial message, and if not, (ii) to register the detected first commercial message in a registration list stored on the first storage, and
the second information processing apparatus further includes a second register configured (i) to determine whether the detected second commercial message is registered at the second information processing apparatus based on the feature quantity of the detected second commercial message, and if not, (ii) to register the detected second commercial message in a registration list stored on the second storage.

7. The one or more non-transitory computer readable media according to claim 4, wherein the functions further include:
determining whether the detected first commercial message is registered at the first information processing apparatus based on the feature quantity of the detected first commercial message, and if not, registering the detected first commercial message in a registration list stored at the first information processing apparatus, and
determining whether the detected second commercial message is registered at the second information processing apparatus based on the feature quantity of the detected second commercial message, and if not, registering the detected second commercial message in a registration list stored at the second information processing apparatus.

* * * * *